US009609054B2

(12) United States Patent
Wang et al.

(10) Patent No.: US 9,609,054 B2
(45) Date of Patent: Mar. 28, 2017

(54) LOAD BALANCING SCALABLE STORAGE UTILIZING OPTIMIZATION MODULES

(71) Applicant: MICROSOFT CORPORATION, Redmond, WA (US)

(72) Inventors: Ju Wang, Redmond, WA (US); Arild E. Skjolsvold, Kenmore, WA (US); Bradley Gene Calder, Bellevue, WA (US); Hosung Song, Issaquah, WA (US); Xinhua Ji, Redmond, WA (US); Ralph Burton Harris, III, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 272 days.

(21) Appl. No.: 14/267,659

(22) Filed: May 1, 2014

(65) Prior Publication Data

US 2015/0319234 A1    Nov. 5, 2015

(51) Int. Cl.
*H04L 29/08* (2006.01)
*G06F 9/50* (2006.01)
(Continued)

(52) U.S. Cl.
CPC ........ *H04L 67/1025* (2013.01); *G06F 3/0683* (2013.01); *G06F 9/5077* (2013.01); *G06F 9/5083* (2013.01); *H04L 47/783* (2013.01)

(58) Field of Classification Search
CPC ... H04L 67/1025; G06F 9/5077; G06F 3/0683
(Continued)

(56) References Cited

U.S. PATENT DOCUMENTS 8,433,848 B1 * 4/2013 Naamad ................ G06F 3/0605
711/114
8,452,819 B1   5/2013 Sorenson et al.
(Continued)

OTHER PUBLICATIONS

"Second Written Opinion Issued in PCT Application No. PCT/US2015/028310", Mailed Date: Mar. 10, 2016, 5 Pages.
(Continued)

*Primary Examiner* — Nicholas Taylor
*Assistant Examiner* — Chong G Kim
(74) *Attorney, Agent, or Firm* — Shook Hardy & Bacon L.L.P.

(57) ABSTRACT

A method includes determining that a trigger condition of a triggered optimization module of a plurality of optimization modules is met and optimizing scalable storage based on an optimization routine. The optimization routine includes providing a plurality of candidate operations and for a selected optimization module of the plurality of optimization modules that has a higher priority than the triggered optimization module, removing a candidate operation from the plurality of candidate operations that would diminish a modeled state of the scalable storage for the selected optimization module. The optimization routine also includes determining at least one operation of the plurality of candidate operations that would improve the modeled state of the scalable storage for the triggered optimization module and updating the modeled state of the scalable storage to model executing the at least one operation. The method further includes executing the at least one operation.

20 Claims, 6 Drawing Sheets

(51) Int. Cl.
*G06F 3/06* (2006.01)
*H04L 12/911* (2013.01)

(58) Field of Classification Search
USPC .......................................................... 709/226
See application file for complete search history.

(56) References Cited

U.S. PATENT DOCUMENTS

| | | | |
|---|---|---|---|
| 8,566,546 B1 * | 10/2013 | Marshak ............... | G06F 3/0604 711/112 |
| 8,566,553 B1 * | 10/2013 | Marshak ............... | G06F 3/0619 711/170 |
| 8,661,136 B2 | 2/2014 | Tumbde et al. | |
| 8,838,887 B1 | 9/2014 | Burke et al. | |
| 2003/0037092 A1 | 2/2003 | McCarthy et al. | |
| 2008/0195646 A1 | 8/2008 | Meijer et al. | |
| 2011/0202723 A1 | 8/2011 | Yochai et al. | |
| 2012/0271996 A1 | 10/2012 | Jenkins et al. | |
| 2013/0054809 A1 | 2/2013 | Urmanov et al. | |
| 2013/0204991 A1 | 8/2013 | Skjolsvold et al. | |
| 2014/0006357 A1 | 1/2014 | Davis et al. | |

OTHER PUBLICATIONS

Non-Final Office Action dated Feb. 22, 2016 in U.S. Appl. No. 14/305,987, 31 pages.
"International Search Report and Written Opinion Issued in PCT Patent Application No. PCT/US2015/028414", Mailed Date: Jul. 8, 2015, 10 Pages.
Addis, et al., "A Hierarchical Approach for the Resource Management of Very Large Cloud Platforms", In IEEE Transactions on Dependable and Secure Computing, vol. 10, Issue 5, Jan. 10, 2013, pp. 253-272.
Morillo, et al., "A Comparison Study of Evolutive Algorithms for Solving the Partitioning Problem in Distributed Virtual Environment Systems", In Parallel Computing, vol. 30,Issue 5, May 1, 2004, pp. 585-610.
Nam, et al., "Multiple Query Scheduling for Distributed Semantic Caches", In Journal of Parallel and Distributed Computing, vol. 70, Issue 5, May 1, 2010, pp. 598-611.
"International Search Report and Written Opinion Issued in PCT Application No. PCT/US2015/028310", Mailed Date: Aug. 12, 2015, 13 Pages.
Kunkle, et al., "A Load Balancing Framework for Clustered Storage Systems," In Proceedings of the 15th International Conference on High Performance Computing, Dec. 17, 2008, pp. 57-72.
Zlotkin, Gilad ., "Cloud Load Balancing Services," published Apr. 5, 2012; http://blog.radware.com/applicationdelivery/cloudcomputing/2012/04/cloud-load-balancing-services/; 9 pages.
Taton, et al., "Self-Optimization of Internet Services with Dynamic Resource Provisioning," Institut National De Recherche En Informatique Et En Automatique, INRIA-00294071, version 1, Jul. 2008, 32 pages.
Jafari, et al., "Optimization Load Balancing Scheduling Algorithm in Distributed Multi-Agent Systems," In International Journal of Computer Science & Network Solutions vol. 1, No. 1, Aug. 2013, pp. 32-44.
International Preliminary Report on Patentability dated Jul. 4, 2016 in PCT Application No. PCT/US2015/028310, 19 pages.
International Preliminary Report on Patentability dated Aug. 17, 2016 in PCT Application No. PCT/US2015/028414, 16 pages.
Notice of Allowance dated Aug. 3, 2016 in U.S. Appl. No. 14/305,987, 5 pages.

* cited by examiner

LOAD BALANCING SCALABLE STORAGE UTILIZING OPTIMIZATION MODULES

BACKGROUND

Distributed systems, including server farms, web services, and the like, have become increasingly common to provide resources, such as computational and storage resources. The resources may be provided by a network of servers, which can be part of a structured system to more efficiently store, retrieve, and query over data throughout the network. It may be desirable to distribute workloads across the servers, in order to optimize resource usage, maximize throughput, minimize response time, avoid overload of one of the servers, and/or achieve other load balancing objectives. However, due to the complexity of modern distributed systems, it can be challenging to effectively and efficiently manage and implement the load balancing objectives.

SUMMARY

The present disclosure is directed, in part, to load balancing scalable storage utilizing one or more optimization modules, substantially as shown in and/or described in connection with at least one of the figures, and as set forth more completely in the claims. In accordance with implementations of the present disclosure, a framework for load balancing includes a plurality of optimization modules. The plurality of optimization modules comprises optimization routines for optimizing the scalable storage with respect to load balancing. The optimization routines can be utilized to select one or more load balancing operations that may further optimization goals of an optimization module for load balancing.

The optimization modules can also comprise trigger conditions that may be utilized to trigger a corresponding optimization routine. Furthermore, optimization modules can have priorities with respect to one another. An optimization routine of a triggered optimization module may take these priorities into account. For example, the optimization routine may defer to higher priority optimization modules. Additionally, the optimization routines may consider lower priority optimization modules. Thus, the priorities can be utilized to establish a hierarchy with respect to the optimization goals being implemented by the optimization routines.

The optimization routines may utilize evaluation scores that quantify a modeled state of the scalable storage with respect to an optimization goal of a corresponding optimization module. An evaluation score can therefore be utilized to characterize load balancing operations with respect to the optimization goal, without necessarily executing the load balancing operations. For example, load balancing operations can be characterized as diminishing, improving, or substantially maintaining the modeled state of the scalable storage. Thus, the evaluation scores can be utilized in an optimization routine to filter load balancing operations by considering a triggered optimization module, as well as other optimization modules.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present disclosure is directed, in part, to load balancing scalable storage. In one respect, implementations of the present disclosure provide a framework for load balancing that includes a plurality of optimization modules that can be utilized for selecting one or more load balancing operations to be executed on the scalable storage. Each optimization module may have an optimization goal with respect to load balancing, which may be carried out by an optimization routine. Optimization routines can employ various types of optimization functions. Some of these optimization functions may be specific to a particular optimization module and others may be shared. Furthermore, an optimization routine may utilize an optimization function of a different optimization module than its corresponding optimization module, for example, to consider an optimization goal of the different optimization module. The framework advantageously allows for highly extensible load balancing logic, in which optimization goals may easily and efficiently be added, removed, or modified.

Figure 1:
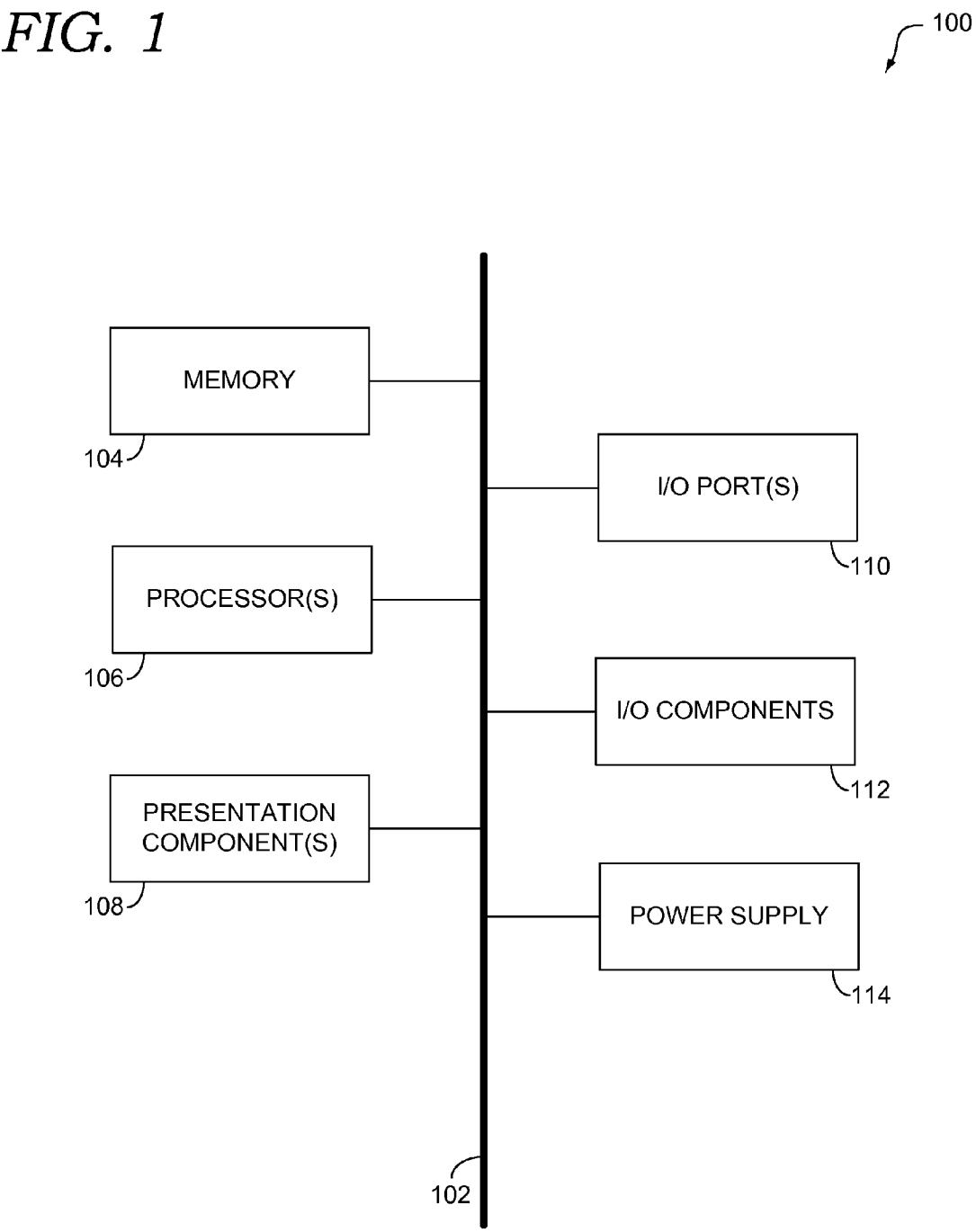
FIG. 1 is a diagram of an exemplary computing environment suitable for use in implementations of the present disclosure.

Referring to FIG. 1, FIG. 1 is a diagram of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Figure 2:
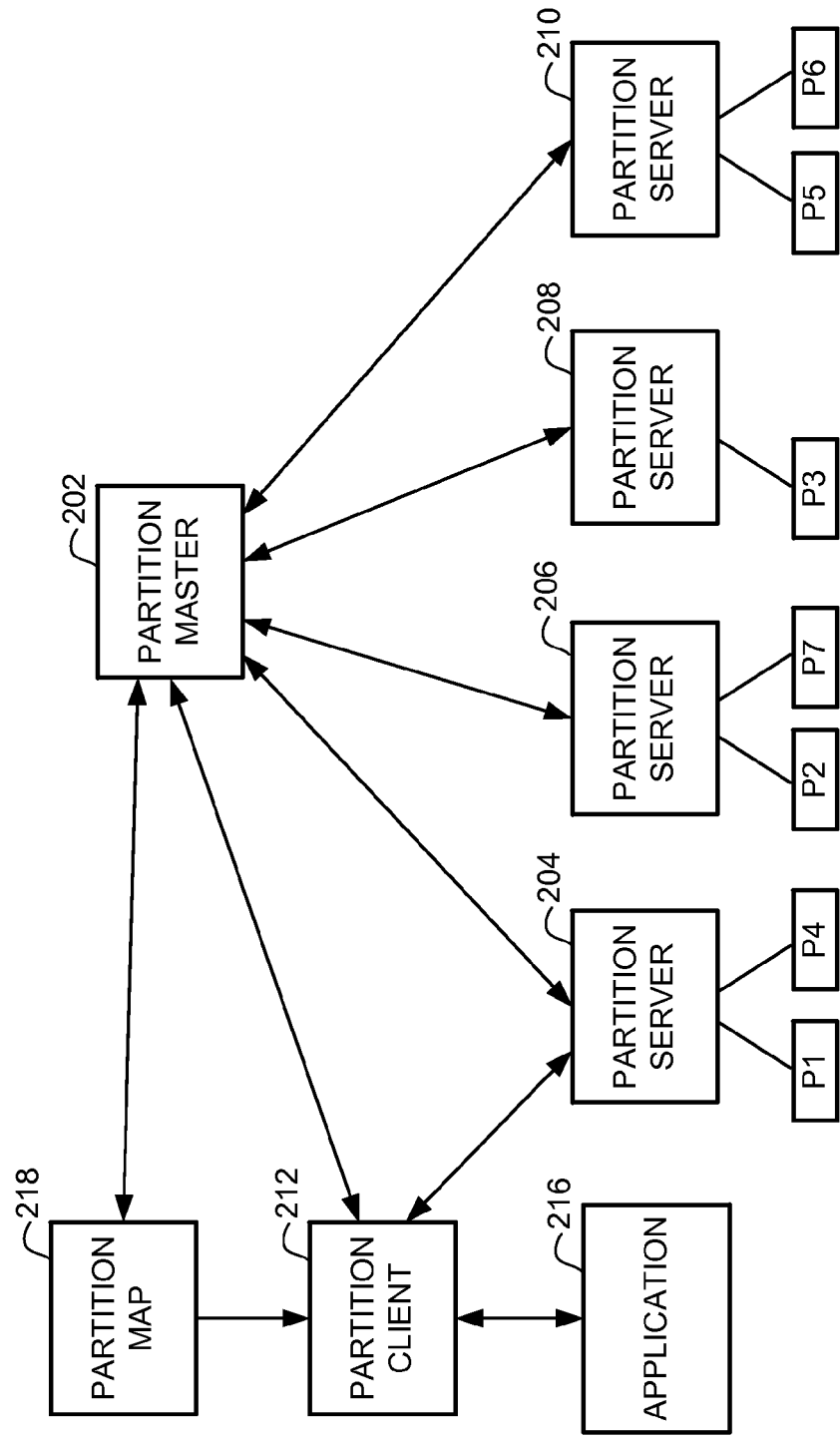
FIG. 2 illustrates an exemplary system in which implementations of the present disclosure may be employed.

Referring now to FIG. 2, FIG. 2 illustrates an exemplary system in which implementations of the present disclosure may be employed. In particular, FIG. 2. shows a high level architecture of scalable storage 200 (also referred to herein as "distributed system 200") in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, distributed system 200 includes master 202 (e.g. partition master 202), servers 204, 206, 208, and 210 (e.g. partition servers 204, 206, 208, and 210), and client 212 (e.g. partition client 212). Each may reside on any type of computing device, which may correspond to computing device 100 described with reference to FIG. 1, for example. The components of distributed system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within distributed system 200 within the scope of implementations of the present disclosure.

In distributed system 200, the servers, such as servers 204, 206, 208, and 210 are utilized to store and provide access to a storage system, for example, a structured storage system. Master 202 is configured to manage the servers. Furthermore, client 212 is configured to provide applications, such as application 216, access to the storage system.

Stored data of scalable storage 200 is divided amongst a plurality of partitions. For example, scalable storage 200 can comprise a key space divided amongst the plurality of partitions. Master 202 is configured to assign the partitions to servers 204, 206, 208, and 210, and/or other servers of distributed system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of distributed system 200 not shown. Additionally, Master 202 is configured to monitor resource utilization with respect to any of the partitions and/or servers 204, 206, 208, and 210, and/or other servers of distributed system 200 not shown.

Each server of distributed system 200, such as servers 204, 206, 208, and 210, can be responsible for providing read and write access to zero to many partitions assigned to the server. Furthermore, each of the partitions can be assigned to a single one of the servers. In the example shown in FIG. 3, server 204 is hosting partitions P1 and P4, server 206 is hosting partitions P2 and P7, server 208 is hosting partition P3, and server 210 is hosting partitions P5 and P6.

Client 212 is linked into an application, such as application 216. In some implementations client 212 is configured to issue commands to some of the partitions (e.g. partitions P1, P2, P3, P4, P5, P6, and P7) hosted by servers 204, 206, 208, and 210 and/or other servers of distributed system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of distributed system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

As indicated above, the servers of distributed system 200 are configured host partitions, thereby providing various resources for the partitions, which can include computational and storage resources. The partitions can, in turn, be associated with workloads of one or more applications. It may be desirable to adjust the distribution of the workloads across the servers, in order to optimize resource usage, maximize throughput, minimize response time, avoid overload of one of the servers, and/or achieve other load balancing objectives. In order to achieve these and other load balancing objectives, one or more masters, such as master 202 can be configured to execute any of various load balancing operations on the partitions assigned to the servers of distributed system 200. In various implementations, potential load balancing operations are associated with partitions assigned to servers of the scalable storage. Some exemplary load balancing operations are described below. However, the present disclosure is not limited to these load balancing operations.

One type of load balancing operation, which can be executed by master 202 comprises a movement of one of the partitions to a different one of the servers of distributed system 200 (movement operation). For example, assume that server 204 has excessive CPU utilization and server 206 has low CPU utilization. Partition P1 may be moved from server 204 to server 206 so that the CPU utilization attributable to partition P1 can instead be accommodated for by server 206. This can relieve server 204 of the excessive CPU utilization, thereby improving load balancing with respect to CPU utilization.

It is noted that movement of a partition does not require physical movement of data at the storage level. Rather, in various implementations, a partition can be moved to another server by reassigning or remapping a partition range assignment of the partition to a new server (e.g. in a partition map). In particular, the partitions of the scalable storage can each correspond to a range of keys in a partitioning index for an object being stored. Exemplary objects include a blob, a table, and a queue. Assigning partitions to partition servers may not move any data stored by the partitions around. Rather, assigning partitions may inform the servers as to what key range(s) of the index the servers are responsible for. For example, master 202 can perform the movement by offloading the partition from one server, assigning the partition to another server, and updating the partition map to reflect that the partition is assigned to the new server.

Another type of load balancing operation, which can be executed by master 202 comprises a splitting of one of the partitions into multiple partitions to be assigned to ones of the servers of distributed system 200 (splitting operation). For example, assume again that server 204 has excessive CPU utilization and server 206 has low CPU utilization. Partition P1 may be split into multiple partitions in a load balancing operation. One or both of the multiple partitions may be assigned to a different server than server 204, such as server 206. In this way, the CPU utilization attributable to partition P1 can be accommodated for by multiple ones of the servers thereby reducing the overall CPU utilization on server 204. Again, splitting of a partition does not require physical movement of data at the storage level. Rather, in various implementations, a partition can be split by updating the partition map to represent the partition as multiple partitions, which are assigned to the servers.

As another example, a type of load balancing operation, which can be executed by master 202 comprises a merging of ones of the partitions into a shared partition to be assigned to one of the servers of distributed system 200 (merging operation). For example, assume that servers 204 and 206 each have too many partitions. Partitions P1 and P2 may be merged into a single partition assigned to server 204 or server 206. In this way, at least one of servers 204 and 206 can host a reduced number of partitions. Again, merging of partitions does not require physical movement of data at the storage level. Rather, in various implementations, partitions can be merged by updating the partition map to represent the partitions as a single partition, which is assigned to one of the servers.

Load balancing logic can be utilized in order to coordinate the load balancing operations performed on distributed system 200 so as to achieve one or more optimization goals with respect to load balancing. As one example, master 202 may implement the load balancing logic of distributed system 200 by determining which types of load balancing operations to perform on distributed system 200 in conjunction with determining partitions and servers on which the load balancing operation are performed. By performing a series of these load balancing operations over time, master 202 can adjust the load balance of distributed system 200 in accordance with the one or more optimization goals.

In various implementations, the load balancing logic incorporates a plurality of optimization goals with respect to load balancing. The plurality of optimization goals with respect to load balancing can take many different forms and may concern any of a variety of different aspects of distributed system 200.

One specific example of an optimization goal comprises maintaining resource utilization of any particular server below a threshold value. The resource utilization may be represented as one or more dimensions, which are later described in additional detail. As an example, it may be an optimization goal to maintain CPU utilization (or a different resource) of each of the servers, or a percentage of the servers, or one or more specific servers, of distributed system 200 below 90% of capacity. In this respect, master 202 may select one or more load balancing operations in order to reduce CPU utilization below 90% of capacity for a server that is above 90% CPU utilization.

Another example of an optimization goal comprises spreading resource utilization amongst the servers of a distributed system so that the resource utilization is not overly concentrated on any of the servers. In this respect, master 202 may select one or more load balancing operations in order to reduce resource utilization of any of the servers, while increasing the resource utilization for other servers.

Another example of an optimization goal comprises spreading partitions that belong to a particular account, of a plurality of accounts hosted on a distributed system, amongst the servers of the distributed system so that the partitions are not overly concentrated on any of the servers. In this respect, master 202 may select one or more load balancing operations in order to reduce the concentration of partitions of any of the servers for the particular account, which may increase the concentration on other servers.

In some approaches to load balancing, aspects of load balancing logic corresponding to some optimization goals of a plurality of optimization goals may inform master 202 to select one or more load balancing operations that can diminish the state of distributed system 200 with respect to others of the plurality of optimization goals. This can cause oscillations in the state of distributed system 200, whereby the optimization goals are continuously competing without being able to reach a stable state for distributed system 200.

To illustrate the forgoing, a first optimization goal may inform master 202 to perform a first load balancing operation to move partition P1 from server 204 to server 206 to improve the state of distributed system 200 with respect to spreading partitions that belong to a particular account amongst the servers where partitions P1 and P4 belong to the particular account and partitions P2 and P7 do not belong to the particular account. However, the load balancing operation may simultaneously increase the CPU utilization of server 206 to above 90% thereby diminishing a second optimization goal to maintain resource utilization of any particular server below 90% of capacity.

Subsequently, the second optimization goal may inform master 202 to perform a second load balancing operation to move partition P1 from server 206 to server 204 to improve the state of distributed system 200 with respect to maintaining resource utilization of any particular server below a 90% of capacity. However, the load balancing operation may simultaneously increase the concentration of the partitions belonging to the particular account on server 204 thereby diminishing the first optimization goal. The first and second load balancing operations may be repeated continuously as the first and second optimization goals compete thereby preventing distributed system 200 from reaching a stable state.

In accordance with some implementations of the present disclosure, load balancing logic of distributed system 200 can implement a plurality of optimization goals while avoiding or significantly reducing oscillations that may prevent distributed system 200 from reaching a stable state. Furthermore, optimization goals can easily be added to or removed from the plurality of optimization goals while maintaining these properties for the load balancing logic of distributed system 200.

Figure 3:
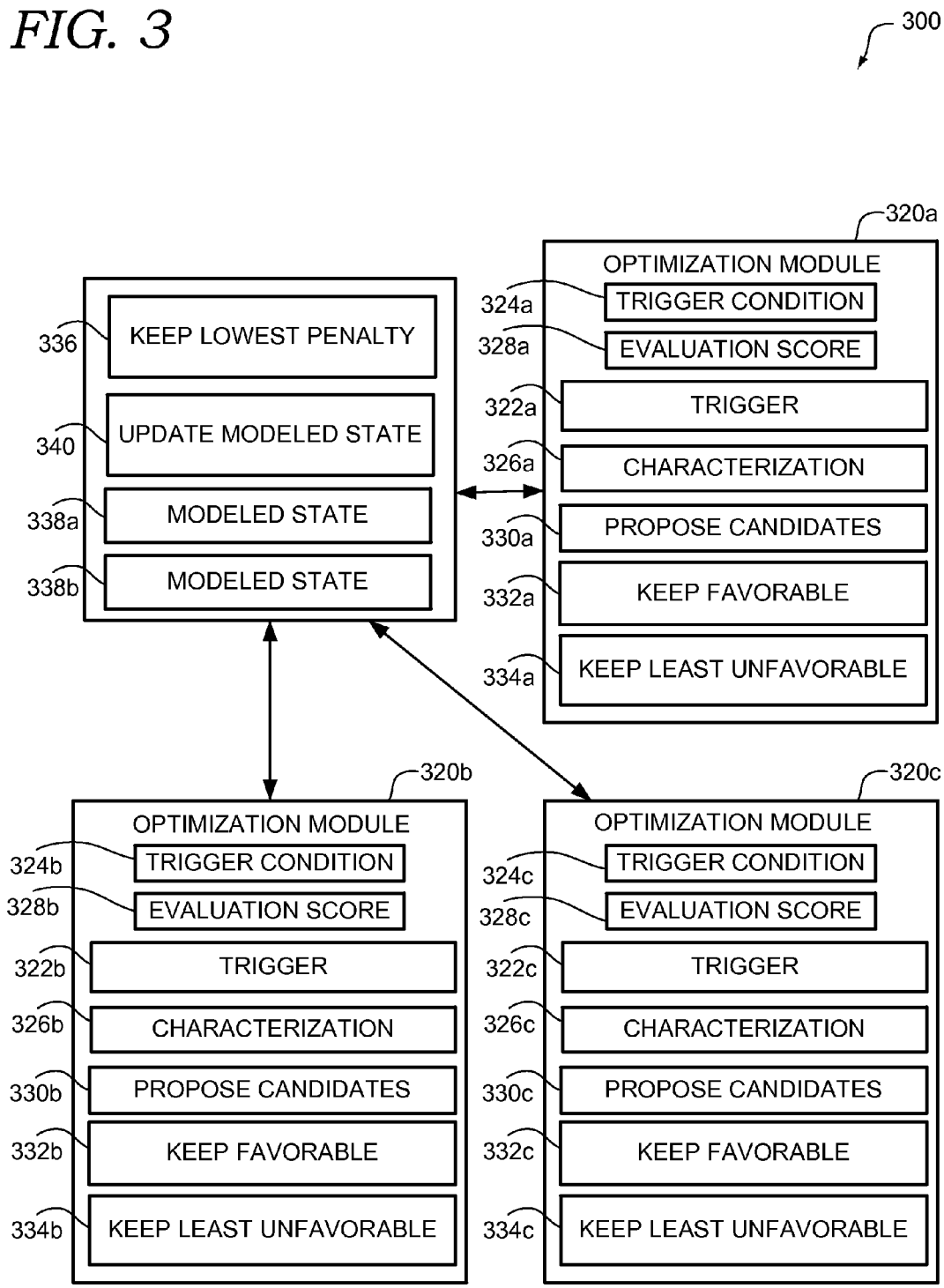
FIG. 3 depicts an exemplary load balancing framework in which implementations of the present disclosure may be employed.

Referring now to FIG. 3, FIG. 3 depicts an exemplary load balancing framework in which implementations of the present disclosure may be employed. Framework 300 can be employed by, for example, master 202 of FIG. 2. Framework 300 includes one or more optimization modules, of which optimization modules 320a, 320b, and 320c are specifically shown. Any of the various constituents of framework 300 can be specific to each optimization module or any portion or portions thereof may be shared. Furthermore, each optimization module of framework 300 can correspond to one of a plurality of optimization goals, which can be carried out utilizing an optimization routine of the optimization module. To this effect, each optimization module can include a trigger condition for the optimization routine and any of various optimization functions for optimization routines.

One or more optimization functions can be utilized by each optimization module in an optimization routine. Examples of optimization functions are shown in FIG. 3, but others can be employed. As shown, optimization module 320a includes optimization functions 322a, 326a, 330a, 332a, and 334a. Optimization modules 320b and 320c are shown as including similar types of optimization functions as optimization module 320a. However, either of optimization modules 320b and 320c can include different types of optimization functions. Furthermore, in various implementations any of the optimization functions can be shared between any of the optimization modules. Examples of shared optimization functions are shown as optimization functions 336 and 340 in FIG. 3, but in various implementations, any of the other optimization functions shown may be shared. Optimization functions are later described in further detail. It is further noted that some optimization functions may be utilized by others, for example, as sub functions. For example, optimization function 326a, which is indicated as a characterization function, may be employed by optimization functions 330a, 322a, 332a, and 334a to, for example characterize one or more load balancing operations.

Each optimization module can have a trigger condition. In response to the trigger condition being met, an optimization routine of the optimization module may be performed. Each optimization module can have a respective trigger condition or some of the trigger conditions can be shared. A trigger function can be utilized to determine whether or not the trigger condition is met. For example, in the implementation shown, optimization module 320a has optimization function 322a, which is a trigger function. Optimization function 322a can be utilized to determine whether trigger condition 324a is met, for example, by returning a true or false, or other indicator. Optimization modules 320b and 320c also have respective optimization functions 322b and 322c and respective trigger conditions 324b and 324c, which can be different than optimization function 322a and trigger condition 324a. As such, in the implementations shown, each optimization module can independently determine whether its corresponding trigger condition is met.

Thus, the trigger condition for one or more of the optimization modules may be met while the trigger condition for one or more others of the optimization modules are concurrently not met. As such, during a given period of time optimization routines may be performed for triggered optimization modules without being performed for other optimization modules. During a later period of time, any of the triggered optimization modules may be different so that different optimization routines are performed as any of various factors used to determine the trigger conditions change. Thus, framework 300 allows for a distributed system, such as distributed system 200, to adapt to various optimization goals over time. Furthermore, optimization modules and corresponding optimization goals can easily and efficiently be added to, removed from, or modified in framework 300.

The trigger condition for any of the optimization modules can be determined by analyzing any of various factors. Exemplary factors described herein may be combined in any suitable manner and in any suitable combination. One exemplary factor comprises a quota. For example, the optimization routine of the optimization module may have an associated quota that determines how many times the optimization routine can be employed, which may be over a given period of time. The quota may increase if other factors of the trigger condition prevent the trigger condition from being met. Additionally the quota may have a cap to limit the number of times the optimization routine can be employed over a given period of time.

Another exemplary factor comprises any of various temporal or time based factors. For example, the trigger condition may be met periodically after a given period of time has elapsed. Yet another exemplary factor may be determined by one or more other optimization modules. For example, the factor may be based on or conditioned on whether or not one or more other optimization routines of the one or more optimization modules have been performed or their trigger conditions have been met. The trigger condition of one optimization module may be met, for example, after the optimization routine of one or more other optimization modules has been performed a given number of times, and potentially over a given period of time. An additional factor may be whether another factor exceeds a threshold value.

Various exemplary factors of the trigger condition for any of the optimization modules can be based on a state of a distributed system that employs framework 300, such as distributed system 200. As one example, any trigger condition can optionally be determined, at least in part, by one or more modeled states of distributed system 200, such as modeled states 338a and 338b. A modeled state can comprise one or more statistics, metrics, and/or other variables related to any of the various constituents of the distributed system, such as those shown in FIG. 2. Modeled states can be determined and managed by, for example, master 202. The variables can be input into, predetermined, or measured or otherwise derived from the distributed system.

Any of the variables can be related to any combination of one or more servers, partitions, masters, clients, applications, or other constituents of the distributed system. At least one of the variables may correspond to the distributed system overall. Limited examples include a total number of servers in the distributed system, and a total number of partitions in the distributed system. At least one of the variables can be expressed in terms of subcomponents of another component of the distributed system. Some examples include a total number of partitions hosted by a particular server, utilization of a particular resource of a particular server, and utilization of a particular resource by a particular partition. In some implementations, the one or more subcomponents are associated with an account of a plurality of accounts hosted by the distributed system. As a few examples, a variable can correspond to partitions or servers that are assigned to or associated with a particular account or resource utilization associated with a particular account. Other exemplary variables can include any of the various variables of evaluation formulas, trigger formulas, and other formulas or functions described herein. It is further noted that any of these function or formulas may derive its variables from the modeled state.

It will therefore be appreciated that the variables that can be incorporated into one or more modeled states can take many different forms and can incorporate many different factors pertaining to the distributed system. By optionally incorporating at least one of those variables into the trigger condition, the trigger condition may be determined by the one or more modeled states. For example, the trigger condition may be determined by a trigger formula, where one to all of the variables of the trigger formula is provided for by the one or more modeled states. The trigger formula can thus provide a trigger score that is calculated from the modeled state of the scalable storage.

A modeled state can correspond to a representation of a state of the distributed system at a given time. A modeled state can correspond to a current or actual state of the distributed system. However, the modeled state may instead correspond to an extrapolated state of the distributed system, for example, that models executing at least one load balancing operation on the distributed system. An extrapolated state of the distributed system can be calculated from or otherwise based on an actual or current state of the distributed system. The extrapolated state can be calculated directly from the actual state or indirectly by being calculated from another extrapolated state, which itself may have been calculated directly from an actual or current state, or from an extrapolated state.

Thus, in some implementations, the trigger condition for any of the optimization modules can be determined based on at least one load balancing operation without necessarily executing the at least one load balancing operation on the distributed system. This can be utilized in some implementations of the present disclosure where an iterative approach to load balancing is desired.

Each optimization module can also be configured to generate an evaluation score. The evaluation score quantifies a modeled state of the distributed system with respect to the optimization goal of its corresponding optimization module. For example, evaluation score 328a can quantify modeled state 338a or 338b with respect to optimization module 320a. By quantifying the modeled state of the distributed system, the evaluation score provides a means for comparing one modeled state of the distributed system to another modeled state of the distributed system (e.g. modeled state 338a to modeled state 338b). In this way, the evaluation score can be utilized to determine or characterize whether one modeled state is an improvement to the modeled state, is a diminishment of the modeled state, or is substantially equivalent to the modeled state with respect to the optimization goal of the optimization module.

An evaluation score may change in one direction (e.g. a positive direction) from one modeled state to another to indicate improvement between the modeled states with respect to an optimization goal. Furthermore, the evaluation score may change in the other direction (e.g. an opposite, negative direction) from one modeled state to another to indicate diminishment between the modeled states with respect to the optimization goal. Also, the evaluation score may stay the same or substantially the same to indicate substantial equivalence between modeled states with respect to the optimization goal. Therefore, the evaluation score can be utilized to determine or characterize whether one modeled state is better or worse than another with respect to the optimization goal, and potentially by how much. Theses determinations or characterizations may be carried out utilizing a characterization function, which is described in additional detail below.

An evaluation score can be determined by an evaluation formula or function, which quantifies an optimization goal of an optimization module. As the optimization modules can each have different evaluation formulas, the optimization modules can correspond to different optimization goals. For example, evaluation scores 328a, 328b, and 328c can quantify a modeled state of the distributed system with respect to different optimization goals. Therefore, the same modeled state may be evaluated with respect to different optimization goals for different optimization modules. As with a trigger formula, and other formulas described herein, one to all of the variables of the evaluation formula can be provided for by the modeled state, such as modeled state 338a or 338b. Thus, the evaluation score can be determined, at least in part, by the modeled state. For an optimization module, a trigger formula may be utilized as the evaluation formula, or the evaluation formula can be different than the trigger formula.

The characterization of a modeled state of scalable storage may be carried out by a characterization function, such as any of characterization functions 326a, 326b, and 326c. A characterization function can return a characterization value corresponding to the change or the amount of the change in the evaluation score between one modeled state and another, as described above. As an example, the one modeled state can correspond to the distributed system prior to performing at least one load balancing operation and the another modeled state can correspond to an extrapolated state of the distributed system that models executing the at least one load balancing operation on the distributed system.

In this way, the characterization function can characterize the at least one load balancing operation with respect to an optimization goal of an optimization module. For example, a characterization function can indicate whether the at least one load balancing operation would improve, diminish, or substantially maintain the modeled state of the distributed system based on a change, or lack thereof, in the evaluation score that would be caused by performing the at least one load balancing operation on the modeled state. Furthermore, a characterization function can be utilized by any of the various optimization functions of an optimization routine in order to evaluate load balancing operations with respect to one another (e.g. by comparing respective characterization values).

A propose candidates function is another example of an optimization function which can be employed in framework 300. The propose candidates function can be part of an optimization routine of an optimization module. As shown, optimization modules 320a, 320b, and 320c include respective optimization functions 330a, 330b, and 330c, which can be respective propose candidates functions. However, like other optimization functions, a propose candidates function can be shared and need not be specific to a particular optimization module.

The propose candidates function can be configured to identify, select, and/or provide a plurality of candidate operations, where the plurality of candidate operations are potential load balancing operations associated with partitions assigned to servers of the distributed system. The plurality of candidate operations that are identified, provided and/or selected by a propose candidates function can be utilized as an initial set of load balancing operations, which may be narrowed by other optimization functions. At least one load balancing operation can be selected by an optimization routine from the plurality of candidate operations.

A propose candidates function can identify, select, and/or provide a group of any combination of movement, splitting, merging, or other load balancing operations. In some implementations, the plurality of candidate operations may all be of the same type, such as all movement operations or all splitting operations, but this need not be the case. Each load balancing operation can be provided by the propose candidates function while identifying one or more partitions and one or more servers associated with the load balancing operation. As one specific example, in some implementations, a movement load balancing operation is identified by a tuple of two elements: <partition, target server>.

One example of a propose candidates function provides all potential load balancing operations that are associated with partitions assigned to servers of the distributed system. However, other examples may provide a portion of all potential load balancing operations, such as all potential load balancing operations of a particular type, or a different subset. A propose candidates function may employ one or more heuristics to select the plurality of candidate operations. The one or more heuristics may be designed to increase the chance that the best load balancing operations are selected for improving the state of the distributed system with respect to an optimization goal of an optimization routine. Therefore, the one or more heuristics can be different with respect to different propose candidates functions and may be tailored to one or more particular optimization goals. A propose candidates function can select the plurality of candidate operations as determined by or based on a trigger formula, an evaluation score, and/or other formulas or functions, which may be incorporated into the heuristics.

A keep favorable function is another example of an optimization function which can be employed in framework 300. The keep favorable function can also be part of an optimization routine of an optimization module. As shown, optimization modules 320a, 320b, and 320c include respective optimization functions 332a, 332b, and 332c, which can be respective keep favorable functions. However, like other optimization functions, a keep favorable function can be shared and need not be specific to a particular optimization module.

A keep favorable function can be configured to filter a set of candidate operations based on an optimization goal of an optimization module, for example, to keep favorable candidate operations with respect to the optimization goal of the optimization module. The input can be a set (e.g. a list) of candidate operations, for example, as provided from a propose candidates function, and the output can be a smaller set that comprises the best or close to best operation(s) as quantified by an evaluation score of an optimization module (e.g. of the optimization module that comprises the function). It is noted that the set of candidate operations may have been filtered or otherwise modified before being provided to the keep favorable function, for example by another optimization function of framework 300.

A favorable candidate operation can correspond to a load balancing operation that improves the modeled state of the distributed system as quantified by an evaluation score and characterized by a characterization function (e.g. a characterization value provided therefrom). A candidate operation having a greater improvement than another can be considered better or more favorable than another having a lesser improvement to the modeled state of the distributed system, as indicated by characterization values. In some implementations, the keep favorable function comprises filtering out ones of the plurality of candidate operations that would diminish or substantially maintain the modeled state of the distributed system, as indicated by the characterization value.

In some implementations, a keep favorable function comprises selecting one or more operations corresponding to a percentage, designated number, or range of the plurality of candidate operations input therein that would improve the modeled state of the scalable storage the most as quantified by an evaluation score of a triggered or other optimization module. For example, the keep favorable function may retain candidate operations that would provide, for example, approximately 90% or greater improvement as compared to the improvement of the best candidate operation (e.g. most favorable operation) in the plurality of candidate operations. Thus, if the best candidate operation had a characterization value of 1.0, all candidate operations having characterization values from 0.9 to 1.0 may be retained or selected by the keep favorable function, as one example.

A keep favorable function can be utilized, for example, to provide flexibility to an optimization routine. For example, the optimization routine for an optimization module can be greedy in that it may determine what is best for its optimization goal while disregarding others. Maintaining a group of candidate operations that are favorable for the optimization goal is one approach to making the optimization routine less greedy. For example, other optimization goals of other optimization modules can be considered by having multiple favorable load balancing operations that may be selected from by the optimization routine. This may be implemented, for example, by providing a keep least unfavorable function that corresponds to at least one other optimization module.

A keep least unfavorable function is another example of an optimization function which can be employed in framework 300. The keep least unfavorable function can also be part of an optimization routine of an optimization module. As shown, optimization modules 320a, 320b, and 320c include respective optimization functions 334a, 334b, and 334c, which can be respective keep least unfavorable functions. However, like other optimization functions, a keep least unfavorable function can be shared and need not be specific to a particular optimization module.

A keep least unfavorable function can be configured to filter a set of candidate operations to keep the least unfavorable candidate operations with respect to an optimization goal of an optimization module (e.g. by an optimization routine from a different optimization module than the optimization module). The input can be a set (e.g. a list) of candidate operations, for example, as provided from a propose candidates function and the output can be a smaller set that comprises the least worst or close to being the least worst operation(s) as quantified by an evaluation score of an optimization module. It is noted that the set of candidate operations may have been filtered or otherwise modified prior to being provided to the keep least unfavorable function, for example by another optimization function of framework 300.

An unfavorable candidate operation can correspond to a load balancing operation that diminishes the state of the distributed system as quantified by an evaluation score and characterized by a characterization function (e.g. a characterization value of the characterization function). A candidate operation having a greater diminishment can be considered worse or more unfavorable than another having a lesser diminishment to the state of the distributed system, as indicated by characterization values. In some implementations, the keep least unfavorable function determines and retains ones of the plurality of candidate operations that would improve the state of the distributed system, as indicated by the characterization value.

In some implementations, the keep least unfavorable function retains at least one unfavorable operation, such as one or more least unfavorable operations of the unfavorable operations. In this respect, the least unfavorable operations can be considered the best of the worst operations for an optimization goal from the input set of candidate operations. The keep least unfavorable function may retain at least one unfavorable operation conditioned upon no favorable operation(s) being included in the input set of candidate operations or the at least one unfavorable operation may be retained regardless. In various implementations, the keep least unfavorable function may always output as least one candidate operation from the input set of candidate operations. One example of a keep least unfavorable function comprises selecting one or more operations corresponding to a percentage, designated number, or range of the input set of candidate operations that would diminish the modeled state of the scalable storage the least as quantified by an evaluation score of an optimization module.

As described above, an optimization routine that maintains a group of candidate operations that are favorable for the optimization goal of its triggered optimization module is one approach to making the optimization routine of the triggered optimization module less greedy. For example, the group of candidate operations can be filtered in accordance with other optimization goals of other optimization modules prior to selecting at least one operation for the optimization routine. The optimization routine of the triggered optimization module can filter the group of candidate operations utilizing a keep least unfavorable function or other function that corresponds to one or more other optimization modules. As such, the group of candidate operations may be filtered in accordance with other optimization goals of other optimization modules by utilizing keep least unfavorable functions of those optimization modules. Where the keep least unfavorable functions retain at least one candidate operation, the optimization routine can still have at least one candidate operation to be selection. Furthermore, by performing a keep favorable function of its optimization module prior to performing keep least unfavorable operations of other optimization modules, the at least one candidate operations can always be favorable to the optimization goal of the optimization routine.

A keep lowest penalty function is another example of an optimization function which can be employed in framework 300. The keep lowest penalty function can also be part of an optimization routine of an optimization module. As shown, framework 300 includes optimization function 336, which can be a keep lowest penalty function. Like other optimization functions, a keep lowest penalty function can be shared or can be specific to a particular optimization module.

A keep lowest penalty function or other penalty function can be configured to filter out one or more candidate operations based on a penalty or penalties associated with executing the one or more of candidate operations on the scalable storage. A penalty can correspond to a cost associated with performing a load balancing operation of the distributed system. For example, a penalty can correspond to time, resource utilization, and/or other factors associated with performing a load balancing operation on the distributed system.

In some implementations, the penalty is based on live traffic of an associated partition or partitions. Higher live traffic can correspond to a higher penalty and/or cost than lower live traffic. Brackets can be defined for the live traffic, so that multiple partitions fall into each bracket. Each bracket can correspond to a different penalty for performing a load balancing operation on those partitions so that partitions within the same bracket have the same associated penalties. As one example, the live traffic may be considered as a request rate where a request rate between 0 and 10 delineates one bracket, between 10 and 100 delineates another bracket, between 100 and 1000 delineates another bracket, and so on. As can be seen the bracket bounds increase for higher ranges of request rates.

A penalty may be calculated as a penalty score, for example by master 202, or can be predetermined or otherwise evaluated. In some implementations, the penalty is derived from other load balancing operations, for example similar load balancing operations, which have been previously executed in the distributed system. As one example, master 202 may measure penalties for executing load balancing operations and determine the penalty based on the measured penalties, such as by an average thereof. Various processes for determining and/or evaluating penalties can be reconfigurable. For example, it may be desirable to override or alter consideration of penalties when an account, the overall system, or other portions of the distributed system is at risk of or is experiencing high latency.

In some implementations, the penalty for a load balancing operation can be determined based on one or more partitions associated with the load balancing operation. For example, partitions may be classified into classes that tend to cause similar costs to be incurred when a load balancing operation is performed thereon. The penalty can be based on or determined by factoring in these classes. A class for a partition can be based on, for example, the partition's associated applications or other processes in the distributed system (e.g. which applications or other operations the partition is assigned to). Partitions associated with system processes may have higher associated penalties than those associated with an account (e.g. user account) or general storage.

In some implementations, a penalty for a candidate operation is based on whether any of the partitions associated with the candidate operation have on-going garbage collection (GC) or other long running background activities which may be negatively affected by the candidate operation.

Also in some implementations, a penalty for a candidate operation is based on whether any of the partitions associated with the candidate operation are associated with or assigned to infrastructure as a service (IAAS) processes of the distributed system. IAAS processes can allow users to outsource equipment including storage, hardware, servers and networking components to the distributed system. The IAAS processes can manage accounts of these users as well as any associated virtual machines, virtual networking, and storage.

In some implementations, a penalty for a candidate operation is based on whether any of the partitions associated with the candidate operation are associated with or assigned to a system table of the distributed system. A system table can comprise storage related to implementing a data storage and management system, which can be a subcomponent of the distributed system. As one example, the system table can comprise information schema views, partition map information, and other critical system metadata.

Partitions associated with GC, system table, and IAAS processes typically have higher associated penalties than other partitions when involved in a load balancing operation. Associated penalties from lowest to highest can be partitions associated with GC, followed by the IAAS, and the system table. This can be reflected in corresponding penalties of load balancing operations and can be factored into a keep lowest penalty function or another function that factors in penalties.

A keep lowest penalty function can be configured to filter a set of candidate operations to keep the candidate operations that have the lowest penalty to the distributed system. The input can be a set (e.g. a list) of candidate operations, for example, as provided from a propose candidates function and the output can be a smaller set that comprises the least worst or close to being the least worst operation(s) in terms of associated penalties. It is noted that the set of candidate operations may have been filtered or otherwise modified prior to being received by the keep lowest penalty function, for example by another optimization function of framework 300. Furthermore, the keep lowest penalty function may optionally be a subfunction of a propose candidates function or other optimization function.

One example of a keep lowest penalty function comprises selecting one or more operations corresponding to a percentage, designated number, or range of the input set of candidate operations that have the lowest associated penalties. Selecting a group of candidate operations that have the lowest penalties is one approach that allows an optimization routine of an optimization module to factor penalties into selecting at least one load balancing operation for the optimization routine.

An update modeled state function is another example of an optimization function which can be employed in framework 300. The update modeled state function can also be part of an optimization routine of an optimization module. As shown, framework 300 includes optimization function 340, which can be an update modeled state function. Like other optimization functions, an update modeled state function can be shared or can be specific to a particular optimization module.

An update modeled state function can be configured to update a modeled state of the distributed system, such as modeled states 338a and 338b. An update modeled state function can be configured to receive a modeled state as input and to output an updated modeled state. Updating a modeled state can comprise updating the one or more statistics, metrics, and/or other variables of the modeled state to reflect executing at least one load balancing operation. One to all of the variables in the updated modeled state may be calculated from one to all of the variables in the modeled state.

The updated modeled state can correspond to a current or actual state of the distributed system. However, the modeled state may instead correspond to an extrapolated state of the distributed system, for example, that models executing the at least one load balancing operation on the distributed system. The extrapolated state can optionally be utilized as a modeled state later input into an update model function. In this way, framework 300 allows for simulating execution of at least one load balancing operation, which may optionally be performed iteratively as additional load balancing operations are selected and/or considered for execution by one or more optimization routines.

Figure 4:
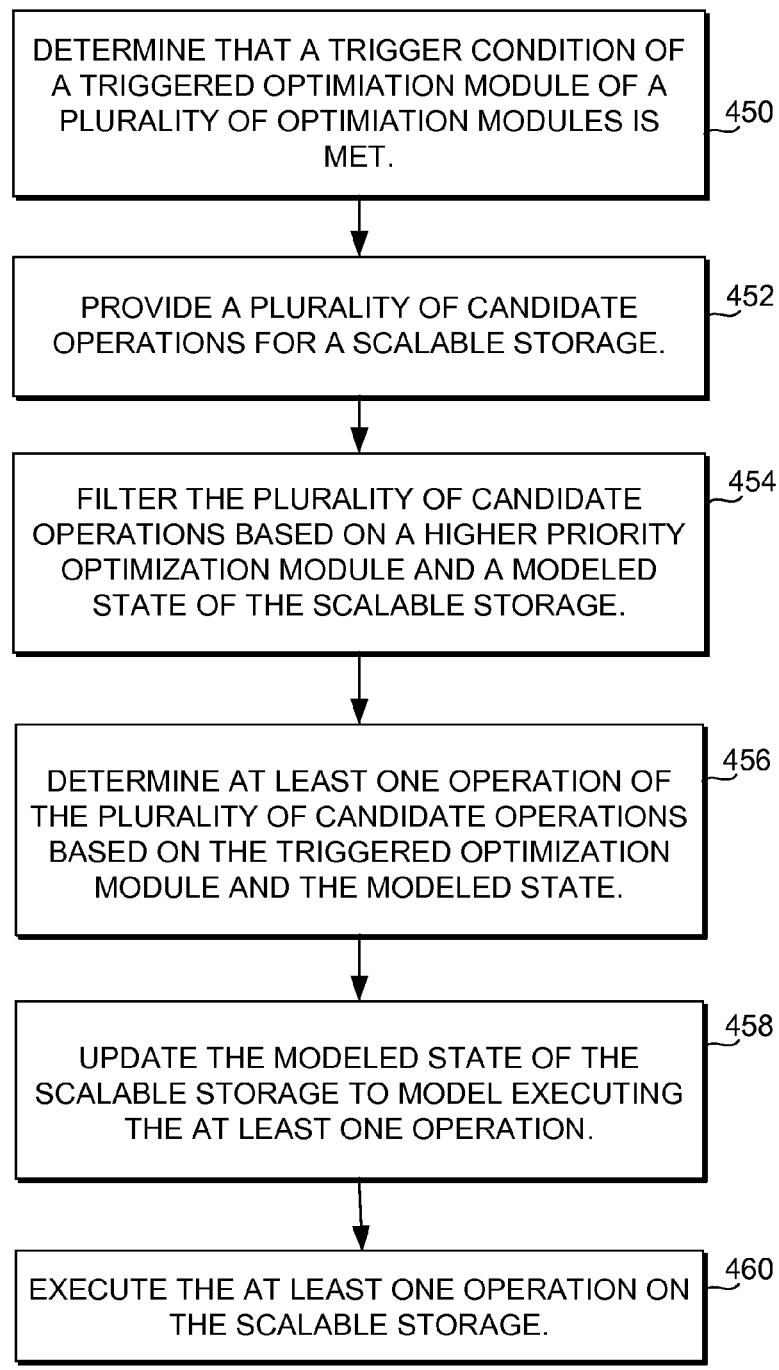
FIG. 4 depicts a flow diagram of an exemplary method for load balancing a scalable storage in accordance with implementations of the present disclosure.

Referring now to FIG. 4, FIG. 4 depicts a flow diagram of an exemplary method for load balancing a scalable storage in accordance with implementations of the present disclosure. In particular, FIG. 4 depicts a flow diagram of method 400, in accordance with implementations of the present disclosure. Method 400 is described below with respect to FIG. 2 and FIG. 3, for illustrative purposes only. However, method 400 is not limited to particular features of distributed system 200 and framework 300 described herein. Furthermore, what is shown in FIG. 4 should not necessarily be considered comprehensive with respect to method 400 in that certain procedures may be omitted or additional procedures may be employed. Also, certain orderings of those procedures indicated by FIG. 4 should not be considered limiting and may be altered in certain implementations of the present disclosure.

Method 400 includes determining that a trigger condition of a triggered optimization module of a plurality of optimization modules is met (450 in FIG. 4). For example, trigger function 322b can determine that trigger condition 322b of optimization module 320b of optimization modules 320a, 320b, and 320c is met. In response to determining that trigger condition 332b is met, trigger function 322b can provide an indicator, such as a true value. Determining that trigger condition 332b of optimization module 330b is met can be based on modeled state 338a. For example, any of various variables in modeled state 338a may be plugged into corresponding variables of a trigger formula of trigger condition 332b. The trigger condition may be determined as met by comparing a result of the trigger formula (e.g. a trigger score) to a threshold value. For example, the trigger condition may be met based on the trigger score exceeding the threshold value.

Method 400 can also include optimizing the scalable storage based on an optimization routine (not specifically shown in FIG. 4). For example, distributed system 200 can be optimized based on an optimization routine of optimization module 320b. The optimization routine of the triggered optimization module may be performed in response to determining that the trigger condition of the triggered optimization module of the plurality of optimization modules is met. Furthermore, the optimization routine may comprise 452, 454, 456, and 458 of method 400, described further below.

Method 400 further includes providing a plurality of candidate operations, where the plurality of candidate operations are potential load balancing operations associated with partitions assigned to servers of the scalable storage (452 in FIG. 4). For example, propose candidates function 330b of optimization module 320b can provide a plurality of candidate operations, where the plurality of candidate operations are potential load balancing operations associated with partitions (e.g. partitions P1, P2, P3, P4, P5, and P6) assigned to servers (e.g. servers 204, 206, 208, and 210) of distributed system 200.

Method 400 also includes filtering the plurality of candidate operations based on a higher priority optimization module and a modeled state of the scalable storage (454 in FIG. 4). For example, master 202 may utilize characterization function 326a of optimization module 320a, which has a higher priority than optimization module 320b, and/or another characterization function of another higher priority optimization module (not shown) to filter the plurality of candidate operations based on modeled state 338a.

Filtering the plurality of candidate operations based on the higher priority optimization module and the modeled state of the scalable storage can comprise, for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module. For example, characterization function 326a of optimization module 320a may provide a characterization value that indicates that a candidate operation from the plurality of candidate operations would diminish modeled state 338a of distributed system 200 as quantified by evaluation score 328a of optimization module 320a. The candidate operation may then be removed from the plurality of candidate operations.

Filtering the plurality of candidate operations based on a higher priority optimization module and a modeled state of the scalable storage allows for candidate operations to be removed from the plurality of candidate operations that may diminish an optimization goal of the higher priority optimization module. This can be utilized to impose a hierarchy on the optimization goals of the optimization modules. In this way, oscillations in the state of distributed system 200 can be reduced or eliminated by reducing competition between the optimization goals.

In some implementations, for the selected optimization module of the plurality of optimization modules that has the higher priority than the triggered optimization module, each candidate operation is removed from the plurality of candidate operations that would diminish a modeled state of the scalable storage as quantified by an evaluation score of the selected optimization module. This may be performed such that the plurality of candidate operations no longer contain any load balancing operation that may diminish the optimization goal of the higher priority optimization module, as quantified by the evaluation score.

Additionally, 454 of method 400 can be performed for each optimization module having a higher priority than the triggered optimization module in framework 300. Method 400 can comprise for each optimization module of the plurality of optimization modules that has a higher priority than the triggered optimization module, removing all candidate operations from the plurality of candidate operations that would diminish a modeled state of the scalable storage as quantified by an evaluation score of the optimization module. Doing so can impose a hierarchy on the load balancing logic such that the various optimization goals of the optimization modules converge and distributed system 200 can reach a stable state.

It is noted that if no candidate operation remains in the plurality of candidate operations, an optimization routine for a triggered optimization module may terminate without selecting a candidate operation.

Method 400 additionally includes determining at least one operation of the plurality of operations based on the triggered optimization module and the modeled state (456 in FIG. 4). For example, at least one operation (e.g. a single operation) of the plurality of operations can be determined based on optimization module 320b and modeled state 338a. This can comprise determining at least one operation of the plurality of candidate operations that would improve the modeled state of the scalable storage as quantified by an evaluation score of the triggered optimization module. For example, the at least one operation of the plurality of candidate operations can be determined that would improve modeled state 338a of distributed system 200 as quantified by evaluation score 328b of optimization module 320b.

In some implementations, determining at least one operation of the plurality of candidate operations that would improve the modeled state of the scalable storage as quantified by an evaluation score of the triggered optimization module is based on one or more characterization values from a characterization function of the triggered optimization module. For example, a characterization value can be generated by optimization function 326b (i.e. a characterization function) for any or all of the plurality of operations, and one or more of the best candidate operations (e.g. having the best characterization values) can be selected from the plurality of operations as the at least one operation.

Also, in some implementations, determining at least one operation of the plurality of candidate operations that would improve the modeled state of the scalable storage as quantified by an evaluation score of the triggered optimization module comprises filtering the plurality of candidate operations based on the triggered optimization module. For example, the plurality of candidate operations may be filtered by optimization function 332b (i.e. a keep favorable function) or another function to remove one to all unfavorable candidate operations with respect to evaluation score 328b from the plurality of candidate operations. Optimization function 332b may filter the plurality of candidate operations so that only favorable operations remain. The at least one operation can thereby be selected by the optimization routine from or as the filtered plurality of candidate operations.

Thus, if only one of the plurality of candidate operations remain after the filtering based on the triggered optimization module, that candidate operation may be selected as the at least one candidate operation by the optimization routine. If multiple ones of the plurality of candidate operations remain after the filtering, those candidate operations may be selected as the at least one candidate operation by the optimization routine. Alternatively, those candidate operations can be filtered further in selecting the at least one candidate operation.

In some implementations, prior to selecting the at least one operation of the plurality of candidate operations, at least one of the plurality of candidate operations is filtered out of the plurality of candidate operations based on a penalty associated with performing the at least one of the plurality of candidate operations on the scalable storage. For example, optimization function 336 (i.e. a keep lowest penalty) or another penalty function can be employed.

Also in some implementations, prior to selecting the at least one operation of the plurality of candidate operations, the plurality of candidate operations are filtered based on at least one lower priority optimization module and the modeled state of the scalable storage. For example, master 202 may utilize characterization function 326c of optimization module 320c, which has a lower priority than optimization module 320b, and/or another characterization function of another lower priority optimization module (not shown) to filter the plurality of candidate operations based on modeled state 338a with respect to the lower priority optimization module.

Filtering the plurality of candidate operations based on the lower priority optimization module and the modeled state of the scalable storage can comprise, for a selected optimization module of the plurality of optimization modules that has a lower priority than the triggered optimization module, removing a candidate operation from the plurality of candidate operations that would diminish a modeled state of the scalable storage as quantified by an evaluation score of the selected optimization module. For example, characterization function 326c of optimization module 320c may provide a characterization value that characterizes that a candidate operation from the plurality of candidate operations would diminish modeled state 338a of distributed system 200 as quantified by evaluation score 328c of optimization module 320c. The candidate operation may then be removed from the plurality of candidate operations.

As another example, filtering the plurality of candidate operations based on a lower priority optimization module and a modeled state of the scalable storage can utilize optimization function 334c (i.e. a keep least unfavorable function) or another function. Filtering the plurality of candidate operations based on a lower priority optimization module and a modeled state of the scalable storage allows the optimization routine of a triggered optimization module to consider one or more lower priority optimization modules, therefore resulting in a less greedy section of the at least one candidate operation by the optimization routine.

In various implementations, filtering the plurality of candidate operations based on at least one lower priority optimization module and a modeled state of the scalable storage is performed while ensuring that not all candidate operations are filtered out of the plurality of candidate operations. In particular, it may be ensured that at least one of the plurality of candidate operations still exists that would improve the state of the scalable storage as quantified by the evaluation score of the triggered optimization module. This can ensure that the optimization routine of the triggered optimization module always has the at least one operation to select for execution on the distributed system.

Method 400 also includes updating the modeled state of the scalable storage to model executing the at least one operation on the scalable storage (458 in FIG. 4). For example, modeled state 338a can be updated to model executing the at least one operation of distributed system 200. This can comprise utilizing optimization function 340 (i.e. an update modeled state function).

The updated modeled state can be utilized to select one or more additional operations to be executed on the scalable storage. For example, the optimization routine of the triggered optimization module can optionally be repeated in response to the trigger condition still being met as determined by the updated modeled state of the scalable storage. In some implementations, the optimization routine is repeated until the trigger condition is no longer met, which optionally can be after the optimization routine has been performed a predetermined number of times.

Also, one or more other optimization routines of one or more other triggered optimization modules can optionally be performed in response to trigger conditions of the one or more other triggered optimization modules. The one or more other optimization routines can be similar to or different than the optimization routine described with respect to optimization module 320b, with corresponding optimization modules being utilized as the triggered optimization module. Those one or more other optimization routines can utilize the updated modeled state and each can update that modeled state similar to the optimization routine of optimization module 320b.

Method 400 also includes executing the at least one operation on the scalable storage (460 in FIG. 4). For example, the at least one operation, which was determined and selected in the optimization routine of optimization module 320b can be executed on distributed system 200. In various implementations, the at least one operation can be executed any time after being determined. As one example, the at least one operation can be executed prior to repeating the optimization routine of the triggered optimization module. The executing the at least one operation and/or the set of proposed operations can be in response to the trigger condition of the triggered optimization module no longer being met.

In some implementations, the optimization routine comprises adding the at least one operation to a set of proposed operations. The set of proposed operations may later be executed on the scalable storage. The set of proposed operations can iteratively grow as one or more additional optimization routines of any of the plurality of optimization modules determine and select at least one operation, which can be added to the set of proposed operations.

It is therefore noted that other optimization routine(s) can be performed prior to the executing the at least one operation that was selected by the triggered optimization module (i.e. optimization module 320b in the current example). Furthermore, the set of proposed operations that are executed can include at least one operation that was selected by the other optimization routine(s). Thus, executing the at least one operation on the scalable storage can comprise executing the set of proposed operations on the scalable storage, which includes the at least one operation that was determined and selected by optimization module 320b.

In various implementations, the optimization routine for each triggered optimization module of the plurality of optimization modules is in response to a respective trigger condition of the triggered optimization module being met. Furthermore, the executing the at least one operation and/or the set of proposed operations can be in response to each or some of the respective trigger conditions no longer being met.

From the forgoing, it will be appreciated that method 400 can be utilized for any of the various optimization modules in framework 300. It will further be appreciated that method 400 can form the basis of more complex methods, which may include one or more instances of method 400 as a subcomponent thereof. One specific example is shown in FIG. 5, which depicts a flow diagram of an exemplary method for load balancing a scalable storage in accordance with implementations of the present disclosure.

Figure 5:
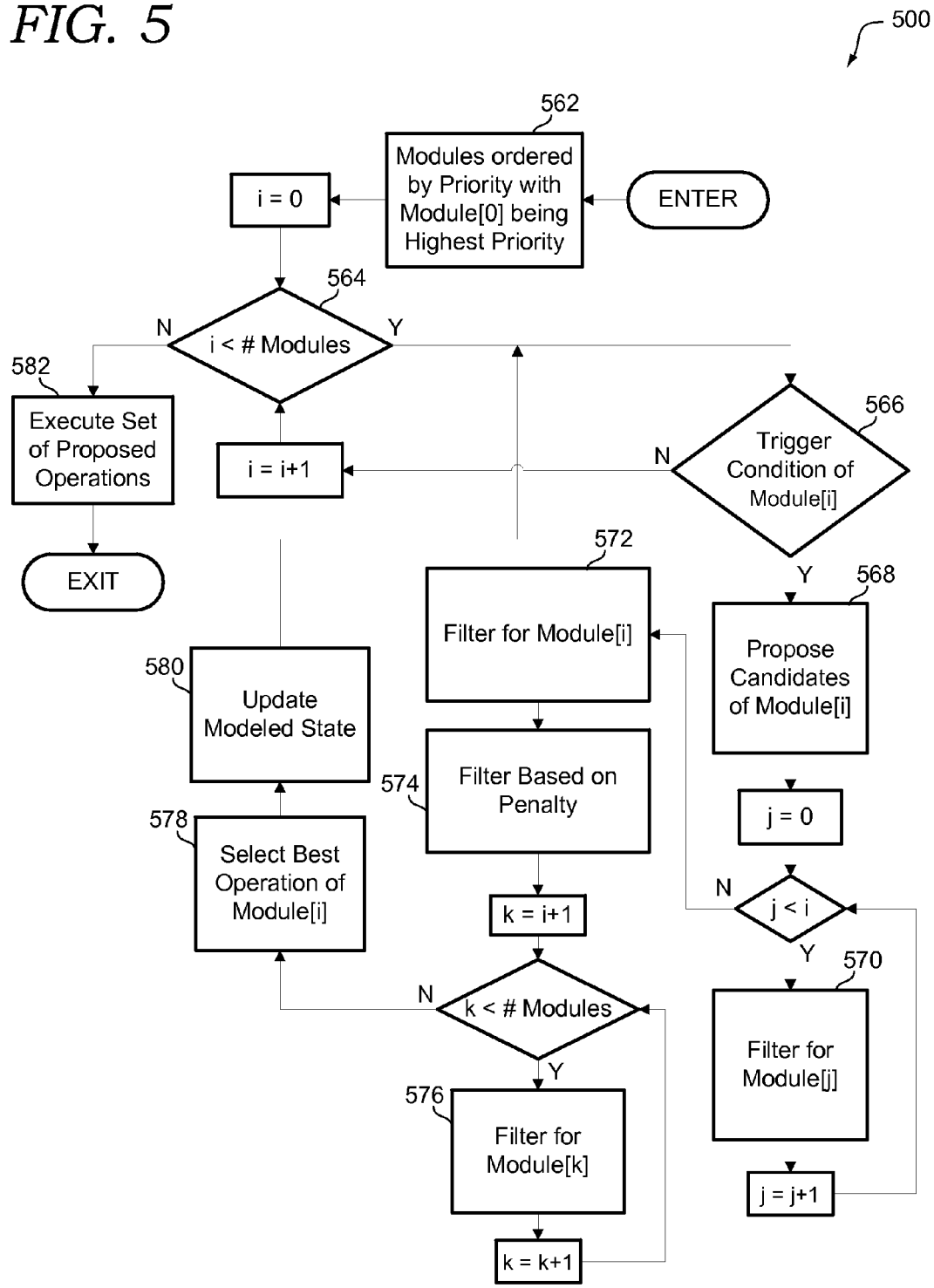
FIG. 5 depicts a flow diagram of an exemplary method for load balancing a scalable storage in accordance with implementations of the present disclosure.

FIG. 5 shows method 500, which begins with receiving list of optimization modules that are ordered by priority (562 in FIG. 5). The list ranges from Module[0] to Module[# Modules], with each integer value corresponding to a respective optimization module. Module[0] of the list is the highest priority optimization module, with the priority of a respective optimization module decreasing as its corresponding integer value increases. Thus, Module[# Modules] corresponds to the optimization module having the lowest priority. It will be appreciated that the list could instead be ordered from lowest priority to highest priority with method 500 being adjusted accordingly.

Method 500 begins with the highest priority optimization module (i.e. module[0]) at 564, and ends after iterating through the list in order of priority. The optimization module corresponding to Module[i] can be referred to as the triggered optimization module where its trigger condition is met. If the trigger function of the optimization module that corresponds to Module[i] is not met at 566, 564 evaluates whether there is a lower priority optimization module remaining in the list. If the trigger function of the triggered optimization module is met at 566, the propose candidates function of the triggered optimization module is performed to select a plurality of candidate operations.

Furthermore, the keep favorable function is performed at 570 on the plurality of candidate operations for all higher priority optimization modules than the triggered optimization module. For example, as can be seen Module[j] will always have a higher priority than Module[i] (i.e. the triggered optimization module) due to the list of optimization modules being ordered by priority. Thus, when j is made equal to i in method 500, any candidate operation(s) that would diminish the state of the scalable storage as quantified by respective evaluation scores of each higher priority optimization module may be removed from the plurality of candidate operations. If no candidate operations remain in the plurality of candidate operations, i may be incremented and method 500 may return to 564.

At 572, the keep favorable function of the triggered optimization module is performed. Thus, any candidate operation(s) that would diminish the state of the scalable storage as quantified by the evaluation score of the triggered optimization module may be removed from the plurality of candidate operations. If no candidate operations remain in the plurality of candidate operations, i may be incremented and method 500 may return to 564.

At 574, the keep lowest penalty function is performed. Thus, at least one of the plurality of candidate operations that has the highest moving penalty may be removed from the plurality of candidate operations.

At 574, the keep lowest penalty function is performed. Thus, at least one of the plurality of candidate operations that has the highest penalty may be removed from the plurality of candidate operations.

The keep least unfavorable function is performed at 576 on the plurality of candidate operations for all lower priority optimization modules than the triggered optimization module. For example, as can be seen Module[k] will always have a lower priority than Module[i] (i.e. the triggered optimization module) due to the list of optimization modules being ordered by priority. Thus, each lower priority optimization module may remove all candidate operations from the plurality of candidate operations while retaining the least unfavorable operations for the lower priority optimization module. Each keep least unfavorable function may be configured to retain at least one candidate operation, such that when k is made equal to i in method 500, the plurality of candidate operations still include at least one operation. Furthermore, due to the keep favorable function at 572, the at least one operation will be favorable to the triggered optimization module.

At 578, the best operation of the plurality of candidate operations is selected and added to a set of proposed operations. At 580, the modeled state utilized by the optimization routine of the triggered optimization module is updated by the update modeled state function. Subsequently, the trigger condition for the triggered optimization module can be evaluated based on the updated modeled state at 566, and various portions of method 500 can repeat to select another best operation and add that best operation to the set of proposed operations. When the trigger condition is no longer met for the triggered optimization module, a different optimization module can become the triggered optimization module, which can result in at least one best operation for the different optimization module being added to the set of proposed operations. This can be repeated for each optimization module, as shown. At 582, the set of proposed operations, if present, is executed on the scalable storage.

Having described various methods, in accordance with implementations of the present disclosure, additional exemplary optimization modules are described below, that may be implemented in methods of the present disclosure. It is noted that features and functions described below are not necessarily specific to a particular type of optimization module or a specific optimization goal.

Dimension Optimization

One approach to load balancing logic of scalable storage only considers live traffic, which is expressed in terms of request rate and latency. However, considering only live traffic can be insufficient for implementing effective load balancing. For example, different, often orthogonal, resources of scalable storage have become increasingly prone to constraint that may not be adequately addressed by load balancing logic that only considers live traffic. This may be due, in part to an increasing number of different request types, and an increasing number of small or large background jobs performed on partitions of scalable storage. An example of a background job is replication of data, where data stored by partitions can be replicated to another location. For example, geo-replication may be employed in geographically distributed scalable storage. Other examples include erasure coding to protect data from storage failure, and data verification. As a result, resource demand of the partitions may often be unproportional to live traffic.

In accordance with implementations of the present disclosure, load balancing logic can consider multiple resources of the scalable storage utilizing one or more dimensions. Each dimension can correspond to one or more resources of the scalable storage. Each of the one or more resources can be a measurable and definable quantity of the scalable storage. Examples of resources that can be considered by the load balancing logic include CPU processing, live traffic volume, network bandwidth, partition count, partition size, and many more.

Any to all of the dimensions employed by the load balancing logic can be defined in terms of one or more metrics that quantify the one or more resources of the dimension. The one or more metrics that define a particular dimension can be selected from a plurality of metrics, which are provided for in load balancing logic. By selecting the one or more metrics from the plurality of metrics for a dimension, the dimension can be easily and efficiently be added to, removed from, or modified for the load balancing logic. Furthermore, corresponding metrics can be compared between different dimensions.

Each metric can quantify utilization of one or more resources of a dimension with respect to any combination of one or more servers and/or partitions of the scalable storage. An example of one such metric is a partition metric. The partition metric can quantify the utilization of the one or more resources of the dimension with respect to one or more partitions (e.g. a single partition). For example, where the one or more resources comprises a CPU resource, the partition metric can quantify the utilization of the CPU resource that is associated with a single partition. A dimension may include a partition metric for each of a plurality of partitions.

In some implementations, the partition metric is substantially independent from the server or servers to which the one or more partitions is assigned. Thus, for example, the partition metric may not substantially change in value due to a load balancing operation that assigns the partition to a different server. CPU utilization is one example of a partition metric that is substantially independent from the server or servers to which the one or more partitions is assigned. A counter example can be throttling, in which a partition may be throttled on an old server, but not on a new server, where the throttling is based on server load, which is specific to a server.

Another example of a metric is a process metric. The process metric can quantify utilization of the one or more resources of the dimension with respect to partitions that are assigned to a server (e.g. each partition that is assigned to the server). In some implementations, the process metric comprises a sum of the partition metrics for each partition that is assigned to the server. Another example of a metric is a server metric. The server metric can quantify overall utilization of the one or more resources of the dimension with respect to the server. In some implementations, the server metric corresponds to the process metric plus additional utilization of the one or more resources of the dimension that is associated with overhead on the server. A dimension can include a process metric and/or a server metric for each of a plurality of servers.

Any to all of the dimensions employed by the load balancing logic can comprise an associated cap value or threshold value. Where a metric of a dimension exceeds the cap value, the one or more resources of the dimension may be considered over utilized by the load balancing logic. An example of a cap value is a server cap value, which corresponds to a threshold value for a server metric, a process metric, or other server related metric. Furthermore, any to all of the dimensions employed by the load balancing logic can comprise an associated improvement threshold. The improvement threshold can be compared to an amount of improvement to a modeled state of the scalable storage that would be caused by at least one load balancing operation, as quantified by an evaluation score. If the amount of improvement does not exceed the improvement threshold, the at least one load balancing operation may not be selected for execution on the scalable storage.

Any to all of the dimensions employed by the load balancing logic can also comprise an associated ranking or weight value with respect to other dimensions that may be employed by the load balancing logic.

Having described some exemplary constituents of a dimension. An exemplary CPU dimension is described. A CPU dimension can be defined by any or all of partition metrics that quantify CPU utilization of a single partition, process metrics that quantify cumulative CPU utilization for all partitions assigned to a server, and server metrics that quantify total CPU utilization on a server. The CPU dimension may further comprise a server cap, for example of 90% of CPU utilization, a weight value of, for example, 1, and an improvement threshold of, for example, 10%.

An exemplary partition count dimension can be defined by any or all of partition metrics that quantify partition utilization of a single partition (which can typically be set to 1), and process or server metrics that quantify partition utilization for all partitions assigned to a server (i.e. the number of partitions assigned to the server). The partition count dimension may further comprise a server cap, for example of 50 partitions, a weight value of, for example, 2, and an improvement threshold of, for example, 1 partition.

Generally, a CPU dimension has a higher weight value or ranking than other dimensions, such as a partition count dimension. However, it is noted that any of the various constituents of the dimensions may be reconfigured and/or redefined while still being compatible with the load balancing logic. For example, the weight value or ranking may be dynamically configurable.

Also, in various implementations, at least some of the metrics of dimensions that are employed by the load balancing logic can be normalized, such that different metrics of different dimensions can be easily compared. In other words, the metrics between different dimensions may be compared utilizing a notionally common scale. As one example, a metric may be normalized as a percentage of a defined capacity for that metric. The capacity for that metric can be the aforementioned cap value or threshold value, as one example. If a metric, such as a partition metric, corresponds to 10% CPU utilization, it may be normalized to 0.1 based on a capacity of 100% CPU utilization. By similarly scaling metrics of different dimensions as percentages of metric capacity, those metrics may easily be compared. In this example, the scaled metrics can have values ranging from 0 to 1.

Dimension Optimization Based on Cap Value

In some implementations, an optimization module, which may be employed in framework 300 (e.g. as optimization module 320b), has an optimization goal to ensure that one or more metrics of one or more dimensions of the scalable storage are not exceeding a corresponding cap value. An optimization routine of the optimization module can utilize any of the various optimization functions described herein.

In some implementations, a trigger condition is determined as being met based on comparing one or more of the metrics of the dimensions to a threshold value, such as a corresponding cap value for the one or more metrics (e.g. a server cap for a server metric). If, for example, any metric (e.g. any server metric) exceeds a particular percentage (e.g. 50%) of the corresponding cap value, the threshold condition may be determined as met. In some implementations, if none of the server metrics of the servers exceed the corresponding cap value for any dimension the threshold condition may not be determined as met, but if any of the server metrics exceed the corresponding cap value for any dimension, the threshold condition may be determined as met.

An evaluation score for an optimization module that utilizes one or more dimensions can be based on one or more of at least one of a metric of a dimension (x), the corresponding cap value (T), the ranking or weight value of the dimension (w), and a value that indicates by how much the metric of the dimension is exceeding the corresponding cap value. As a specific example, an evaluation formula for a given server can comprise $S=\Sigma_i p_i * w_i$, where $$p(x) = \begin{cases} 0, & \text{when } x < T \\ e^{ax} - e^{aT}, & \text{when } x \geq T \end{cases},$$

where each dimension i has a server metric x. Constant a controls the slope of the evaluation formula (the scaling factor on the X-axis). Values for constant a range from approximately 2 to approximately 10, as examples.

This exemplary evaluation formula has exponential growth with respect to the server metric. It will therefore be appreciated that in some implementations, the evaluation score increases exponentially with one or more metrics in the evaluation formula.

The exemplary evaluation formula can be for a given server, however, multiple servers can be considered in the evaluation score by utilizing the exemplary evaluation formula for each of the multiple servers and adding the results. Thus, the evaluation score may correspond to one server, multiple servers, or all servers of the scalable storage, as desired.

A propose candidates function for an optimization module that utilizes one or more dimensions can comprise selecting a plurality of candidate operations based on one or more metrics of one or more dimensions. In some implementations, the plurality of candidate operations is selected based on the server metric of the server to which the plurality of candidate operations are assigned.

In some implementations, selecting the plurality of candidate operations comprises identifying one or more servers that have a server metric of a dimension, or a particular dimension that exceeds a threshold value, such as the server cap value.

At least some of the partitions assigned to those servers can be added to a candidate partition set. However, one or more partitions may be excluded from the candidate partition set based on traffic associated with the one or more partitions, for example, high traffic partitions may be excluded.

Furthermore, the one or more servers can be identified based on server load, such that the plurality of candidate operations is selected based on server load of the one or more servers. For example, the propose candidates function can sort each server of the scalable storage from busiest to idlest as quantified by a load metric, such as a server load metric. One or more of the busiest of those servers may be selected as the one or more servers from which the partitions may be selected for the candidate partition set.

The server load metric can be based on at least one of any of server metrics (d) of one or more dimensions (i), and rankings or weight values (w) for the one or more dimensions. In one implementation, a server load metric comprises Load=$\Sigma_i d_i * w_i$.

The propose candidates function can determine a dimension of the one or more servers that has the single highest server metric. Furthermore, the propose candidates function may sort the servers of the scalable storage from highest to lowest server metric of the dimension. A candidate target server set may be selected as a number of those servers that have the lowest server metric of the dimension. Thus, servers can be added to the candidate target server set based on a server metric of a dimension, for example, based on having a low server metric.

The plurality of candidate operations that are selected by the propose candidates function may then, for example, be ones that would reduce the server metric of a dimension that has exceeded a server cap for one or more servers. For example, movement load balancing operations of the plurality of candidate operations can comprise the Cartesian product of the candidate partitions set and the candidate target server set. Thus, a load balancing operation could comprise a given partition from the candidate partitions set being moved to a given server of the candidate target server set, for each combination of partition and server in the sets.

Thus, the optimization routine of the optimization module can utilize the plurality of candidate operations from the propose candidates function to select at least one operation for execution on the scalable storage. The plurality of candidate operations can be filtered by the optimization routine utilizing any of the various optimization functions, such as a keep favorable function and keep least unfavorable functions.

Dimension Spread Optimization

In some implementations, an optimization module, which may be employed in framework 300 (e.g. optimization module 320b), has an optimization goal to spread metrics of dimensions, of a plurality of dimensions, amongst the servers of the scalable storage. This optimization goal may be desirable for various reasons, such as to reduce the risk of the servers of the scalable storage becoming overloaded. An optimization routine of an optimization module implementing a dimensional spread optimization can utilize any of the various optimization functions described herein.

With such an optimization goal in mind, a trigger condition of a triggered optimization module may be determined as met where one or more metrics of one or more dimensions of the scalable have an imbalance with respect to servers of the scalable storage. Therefore, the optimization routine for at least one of the plurality of optimization modules of framework 300 may be performed in response to one or more metrics of one or more dimensions of the scalable having an imbalance with respect to servers of the scalable storage.

Whether or not or more metrics have the imbalance may be quantified by a trigger formula and a trigger score. In some implementations, the trigger condition is determined as being met where at least one of the one or more metrics has the imbalance.

In some implementations, the trigger condition is determined as being met based on comparing one or more of the metrics of the dimensions to a threshold value, such as a corresponding cap value for the one or more metrics (e.g. a server cap for a server metric). In addition or instead, the trigger condition can be determined as being met utilizing a trigger formula based on at least one of any of server load (L), one or more busiest servers (i), and one or more idlest servers (j). An exemplary trigger formula comprises $S=\overline{L_i}/\overline{L_j}=$, which is a ratio between the average server load of one or more busiest servers and the average server load of one or more idlest servers. The server load can comprise the server load metric described above. The trigger condition can then be determined as being met based on trigger score S exceeding a threshold value. For example, if the trigger score is less than 1.5, the trigger condition may still be met.

The trigger condition may also be based on a quota that sets a global rate of load balancing operations being executed on the scalable storage. The quota be implemented similar to what has been described above with respect to various exemplary factors of a trigger condition.

Thus, the trigger formula can allow for a trigger score of the trigger condition to be compared to a threshold value. Thus, determining that the one or more metrics of one or more dimensions of the scalable have an imbalance with respect to servers of the scalable storage can comprise comparing a trigger score calculated from the modeled state of the scalable storage to a threshold value. The trigger condition may be determined as met based on the trigger score exceeding the threshold value.

An evaluation score for an optimization module implementing a dimension spread optimization can quantify the balance of one or more metrics of one or more dimensions of the scalable with respect to servers of the scalable storage. It may be desirable for an evaluation formula that generates an evaluation score to be different than a trigger function that generates a trigger score. One reason it may be desirable to utilize an evaluation formula that is different than a trigger formula is where the trigger formula cannot be effectively utilized to characterize improvement made by at least one load balancing operation. For example, some load balancing operations that improve dimension spread may not change the trigger formula. It may be desirable to utilize a variance formula or a standard deviation formula for the evaluation formula.

In some implementations, the evaluation score is based on at least one of one or more dimensions (i), one or more partition servers (j), one or more metrics (d), and/or one or more ranking or weight values (w). As a specific example, the evaluation formula can comprise $S_i=\Sigma_j(d_{ij}-\overline{d}_i)^2$, where $\overline{d}_i$ is the average of $d_{ij}$ over j. Thus, the evaluation score of the triggered optimization module can be calculated from a variance formula based on server metrics of the servers.

The exemplary evaluation formula can be for a given dimension, however, multiple dimensions can be considered in the evaluation score by utilizing the exemplary evaluation formula for each of the multiple dimensions and adding the results. Thus, the evaluation score may correspond to one dimension, multiple dimension, or all dimensions of the scalable storage, as desired. As an example, the evaluation formula can correspond to $S=\Sigma_i w_i S_i$, where S is the evaluation score.

A propose candidates function can comprise selecting a plurality of candidate operations based on server load of one or more servers. For example, the propose candidates function can sort each server of the scalable storage from busiest to idlest as quantified by a load metric, such as the server load metric. One or more of the busiest of those servers may be selected as the one or more servers.

At least some of the partitions assigned to those servers can be added to a candidate partition set. However, one or more partitions may be excluded from the candidate partition set based on traffic associated with the one or more partitions, for example, high traffic partitions may be excluded.

Furthermore, a candidate target server set may be selected as a number of servers that have the lowest server load. The plurality of candidate operations that are selected by the propose candidates function may then, be determined from the propose candidate set and the propose target server set. For example, movement load balancing operations of the plurality of candidate operations can comprise the Cartesian product of the candidate partitions set and the candidate target server set. Thus, a load balancing operation could comprise a given partition from the candidate partitions set being moved to a given server of the candidate target server set, for each combination of partition and server in the sets.

Thus, the optimization routine of the optimization module can utilize the plurality of candidate operations from the propose candidates function to select at least one operation for execution on the scalable storage. The plurality of candidate operations can be filtered by the optimization routine utilizing any of the various optimization functions, such as a keep favorable function and keep least unfavorable functions.

Account Spread Optimization

The load balancing logic implemented in framework 300 can have an optimization goal to spread partitions from an account, of a plurality of accounts, hosted by the scalable storage, amongst the servers of the scalable storage. For example, it may be desirable to spread the partitions to as many servers as possible. This may be desirable for various reasons, such as to reduce the chance that a limited number of servers being compromised heavily impacts the partitions of the account. An optimization routine of an optimization module implementing account spread optimization can utilize any of the various optimization functions described herein.

With such an optimization goal in mind, a trigger condition of a triggered optimization module may be determined as met where partitions of an account hosted by the scalable storage have an imbalance in assignments with respect to servers of the scalable storage. Therefore, the optimization routine for at least one of the plurality of optimization modules of framework 300 may be performed in response to a plurality of partitions of an account of a plurality of accounts hosted by the scalable storage having an imbalance in assignments with respect to one or more of the servers.

Whether or not a particular account or multiple accounts of the plurality of accounts have the imbalance may be quantified by a trigger formula and a trigger score. In some implementations, the trigger condition is determined as being met where at least one of the plurality of accounts has the imbalance.

In some implementations, the trigger condition is based on at least one of the total number of partitions associated with an account ($C_{total}$) the total number of servers available to the partitions associated with the account in the scalable storage ($N_{total}$), the number of the servers that contain at least one of the partitions associated with account ($N_{assigned}$), and the maximum number of servers to which the partitions of the account could potentially be spread ($\min(C_{total}, N_{total})$). The trigger condition can also be based on at least one of the maximum number of the partitions that can be assigned to a given server ($C_1$), and the ideal maximum number of the partitions that could be assigned to the same server, were the partitions of the account perfectly spread ($C_2$). For example, $C_2$ may be equal to $C_{total}/N_{total}$.

As a specific example, the trigger condition can comprise a trigger formula $S=(N_{max}-N_{assigned})/N_{max}+(C_1-C_2)/C_{total}$, where S is a trigger score of the trigger function. $(N_{max}-N_{assigned})/N_{max}$ quantifies the account spread in terms of the servers currently hosting the partitions of the account. The higher the value, the worse the account spread. $(C_1-C_2)/C_{total}$ quantifies the account spread in terms of the maximum potential risk of losing availability of partitions if one of the servers becomes compromised. The higher the value, the higher the maximum potential risk.

Therefore, suppose an account has 3 partitions ($C_{total}$), and they are all assigned to one server of 100 total partition servers ($N_{total}$) in the scalable storage. $N_{assigned}=1$, since all 3 partitions are assigned to 1 server. $N_{max}=\min(100, 3)=3$, which indicates that the partitions could potentially be hosted by 3 servers. $C_1=3$, since the maximum number of partitions in one server is 3 in this example. $C_2=(3/100)$ rounded to 1, since an ideal account spread would have the 3 partitions spread to 3 servers, with 1 partition per server. A resultant trigger score S, in this example, would be $(3-1)/3+(3-1)/3=$approximately 1.3333.

Advantageously, the trigger formula allows for the trigger score to be easily and effectively compared to a threshold value. Thus, determining that the partitions of the account hosted by the scalable storage have an imbalance can comprise comparing a trigger score calculated from the modeled state of the scalable storage to a threshold value. The trigger condition may be determined as met based on the trigger score exceeding the threshold value. For example, utilizing the exemplary trigger formula above, the trigger condition may be determined as met based on the trigger score exceeding 1, in the positive direction. It will be appreciated that the threshold value can optionally be configured and tuned over time.

An evaluation score for an optimization module implementing an account spread optimization can quantify an imbalance in a plurality of partitions of an account of a plurality of accounts hosted by the scalable storage. It may be desirable for an evaluation formula that generates an evaluation score to be different than a trigger function that generates the trigger score. One reason it may be desirable to utilize an evaluation formula that is different than a trigger formula is where the trigger formula does not effectively track improvement made by at least one load balancing operation. For example, some load balancing operations that improve account spread may not change the results of the trigger formula described above. It may be desirable to utilize a variance formula or a standard deviation formula for the evaluation formula.

In some implementations, the evaluation score is based on at least one of the number of partitions of an account on a given server (d), and the average number of partitions of the account for any given server ($\bar{d}$). As a specific example, the evaluation formula can comprise $S=\Sigma_i(d_i-\bar{d})^2$, where S is the evaluation score and is evaluated for each server i of the account. Thus, the evaluation score of the triggered optimization module can be calculated from a variance formula based on amounts of the assignments of the partitions belonging to the servers.

A propose candidates function that can be utilized by an optimization module implementing an account spread optimization can comprise identifying one or more accounts of the plurality of accounts that have a trigger score, an evaluation score, or other score that is indicative of account spread, that exceeds a threshold value (i.e. accounts that are imbalanced). The trigger score and trigger formula may be considered respectively for one or more accounts of the plurality of accounts. Utilizing the exemplary trigger score and trigger formula described above, the threshold value may be 1 for each account being considered. The threshold value and the trigger formula are configured such that an account having 2 partitions, all on the same server (with at least one other server available for a partition), will be considered imbalanced (i.e. the threshold value will be exceed in this case). However, in the same example, if each partition is on a separate server the account will not be considered imbalanced (i.e. the threshold value will be not be exceed in this case).

In some implementations, the propose candidates function proposes the plurality of candidate operations for a single account at a time. For example the optimization routine of the optimization module may be performed for a single account, with the evaluation score being considered with respect to that account. It is noted that in various implementations, the optimization routine of the optimization routine may be performed for multiple accounts, with the evaluation score being considered with respect to those accounts. Thus, a propose candidates function may propose the plurality of candidate operations for any number of the plurality of accounts.

The optimization routine may be repeated for the same account(s) or a different account(s) based on the trigger condition of the optimization module still being met in an updated modeled state. In some implementations, the account(s) being considered in a given optimization routine is selected in a round robin fashion from the plurality of accounts.

In some implementations, the load balancing operations are selected by the propose candidates function based on traffic associated with the partitions. For example, load balancing operations that are associated with one or more of the partitions that are experiencing high traffic may not be included in a plurality of candidate operations, which are provided by the propose candidates functions. In some implementations, the propose candidates function only considers load balancing operations that are associated with one or more of the partitions that have traffic that does not exceed a threshold value. Thus, at least one of load balancing operations may be excluded from the plurality of candidate operations based on one or more associated partitions having high traffic.

The propose candidates function can select the plurality of candidate operations based on amounts of partitions of an account(s) that are assigned to the servers. For example, the propose candidates function can identify and consider the amount of the partitions assigned to any to all servers of the scalable storage. In some implementations, the propose candidates function determines which of the servers host the highest amount of the partitions of the account(s). The partitions assigned to those servers can be added to a candidate partition set. Thus, the propose candidates function can comprise selecting a plurality of candidate operations based on an amount of assignments of partitions belonging to ones of the servers as compared to others of the servers, for example based on a high amount of the partitions being assigned to a server. Ones or more partitions may be excluded from the candidate partition set based on traffic associated with the one or more partitions, for example, high traffic partitions may be excluded.

In some implementations, the propose candidates function determines which of the servers host the lowest amount of the partitions of the account(s). Those servers can be added to a candidate target server set. Thus, servers can be added to the candidate target server set based on the amounts of the partitions that are assigned to the servers.

The propose candidates function can select the plurality of candidate operations based on server load of the servers of the scalable storage. For example, the propose candidates function can sort each server of the scalable storage from busiest to idlest as quantified by a load metric, such as the server load metric described above. The candidate target server set may be limited to a number of those servers that have the lowest server load. Thus, servers can be added to the candidate target server set based on server load, for example, based on having low server load.

The plurality of candidate operations that are selected by the propose candidates function may then, for example, be ones that would increase the spread of any of the partitions in the candidate partitions set, where any of the servers in the candidate target server set would receive a new partition of the account(s). For example, movement load balancing operations of the plurality of candidate operations can comprise the Cartesian product of the candidate partitions set and the candidate target server set. Thus, a load balancing operation could comprise a given partition from the candidate partitions set being moved to a given server of the candidate target server set, for each combination of partition and server in the sets.

Thus, the optimization routine of the optimization module can utilize the plurality of candidate operations from the propose candidates function to select at least one operation for execution on the scalable storage. The plurality of candidate operations can be filtered by the optimization routine utilizing any of the various optimization functions, such as a keep favorable function and keep least unfavorable functions. However, if utilized, the keep favorable function may not filter out any of the plurality of candidate operations due to them all being favorable to the optimization module in light of the means for selecting the plurality of candidate operations in the propose candidates function.

Additional Examples

In one aspect, a computer-implemented method for load balancing a scalable storage is provided. The method comprising: determining that a trigger condition of a triggered optimization module of a plurality of optimization modules is met; optimizing the scalable storage based on an optimization routine, the optimization routine comprising: providing a plurality of candidate operations, wherein the plurality of candidate operations are potential load balancing operations associated with partitions assigned to servers of the scalable storage; for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module; and determining at least one operation of the plurality of candidate operations that would improve the modeled state of the scalable storage as quantified by an evaluation score of the triggered optimization module; and updating the modeled state of the scalable storage to model executing the at least one operation on the scalable storage; executing the at least one operation on the scalable storage.

In another aspect, one or more computer-storage media storing computer-useable instructions that, when executed by a computing device, perform a method for load balancing a scalable storage is provided. The method comprising: for each triggered optimization module, of a plurality of optimization modules, optimizing the scalable storage based on an optimization routine, the optimization routine comprising: providing a plurality of candidate operations, wherein the plurality of candidate operations are potential load balancing operations associated with partitions assigned to servers of the scalable storage; for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module; determining at least one operation of the plurality of candidate operations that would improve the modeled state of the scalable storage as quantified by an evaluation score of the triggered optimization module; adding the at least one operation to a set of proposed operations; and updating the modeled state of the scalable storage to model executing the at least one operation on the scalable storage; executing the set of proposed operations on the scalable storage.

Figure 6:
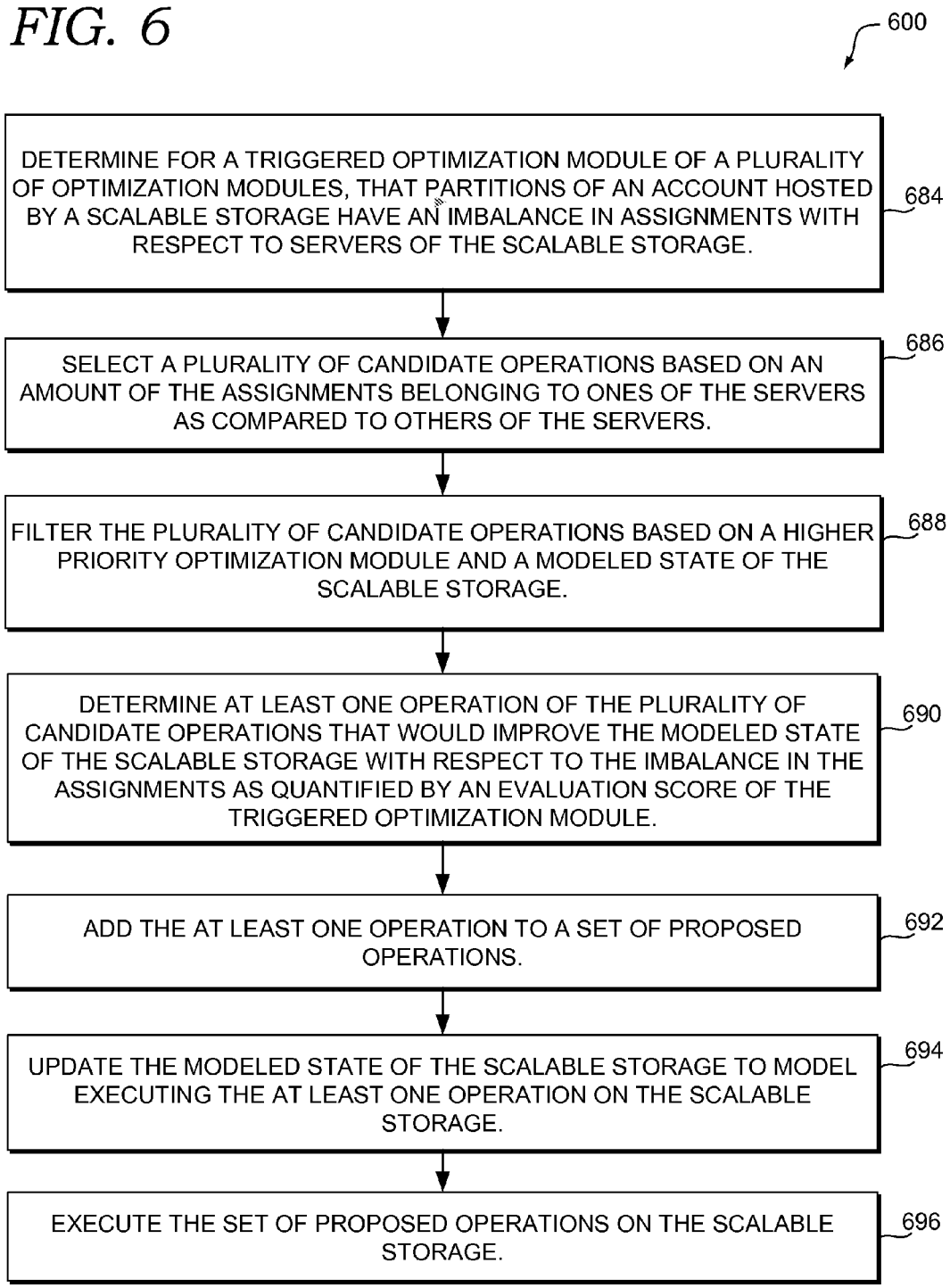
FIG. 6 depicts a flow diagram of an exemplary method for load balancing a scalable storage in accordance with implementations of the present disclosure.

Referring to FIG. 6, FIG. 6 depicts a flow diagram of an exemplary method for load balancing a scalable storage in accordance with implementations of the present disclosure. In particular, FIG. 6 depicts a flow diagram of method 600, in accordance with implementations of the present disclosure. In one aspect, a computer-implemented method for load balancing a scalable storage is provided (e.g. method 600 in FIG. 6). The method comprising: determining, for a triggered optimization module of a plurality of optimization modules, that partitions of an account hosted by the scalable storage have an imbalance in assignments with respect to servers of the scalable storage, and in response to the determining (e.g. 684 in FIG. 6), performing a selection comprising: selecting a plurality of candidate operations based on an amount of the assignments belonging to ones of the servers as compared to others of the servers, wherein the plurality of candidate operations are potential load balancing operations associated with the partitions assigned to the servers of the scalable storage (e.g. 686 in FIG. 6); for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module (e.g.

688 in FIG. 6); and determining at least one operation of the plurality of candidate operations that would improve the modeled state of the scalable storage with respect to the imbalance in the assignments as quantified by an evaluation score of the triggered optimization module (e.g. 690 in FIG. 6); adding the at least one operation to a set of proposed operations (e.g. 692 in FIG. 6); updating the modeled state of the scalable storage to model executing the at least one operation on the scalable storage (e.g. 694 in FIG. 6); executing the set of proposed operations on the scalable storage (e.g. 696 in FIG. 6).

Thus, in accordance with implementations of the present disclosure, load balancing scalable storage can be implemented utilizing one or more optimization modules. Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computer-implemented method for load balancing a scalable storage, the method comprising:
   determining that a trigger condition of a triggered optimization module of a plurality of optimization modules is met;
   optimizing the scalable storage based on an optimization routine, the optimization routine comprising:
      generating a list of candidate operations for a state of the scalable storage, wherein each candidate operation in the list comprises a load balancing operation associated with at least one partition assigned to a server of the scalable storage;
      for a selected optimization module of the plurality of optimization modules that has a higher priority than the triggered optimization module, removing a candidate operation from the list of candidate operations that would diminish a model of the state of the scalable storage as quantified by an evaluation score of the selected optimization module;
      determining at least one operation in the list of candidate operations that would improve the model of the state of the scalable storage as quantified by an evaluation score of the triggered optimization module; and
      updating the model of the state of the scalable storage to model executing the at least one operation on the state of the scalable storage; and
   executing the at least one operation on the state of the scalable storage.

2. The computer-implemented method of claim 1, comprising repeating the optimization routine in response to the trigger condition still being met as determined by the updated model of the scalable storage, wherein the executing comprises executing the at least one operation from each instance of the optimization routine on the state of the scalable storage.

3. The computer-implemented method of claim 1, wherein the determining the at least one operation comprises selecting one or more operations corresponding to a percentage of operations in the list of candidate operations that would improve the model of the state of the scalable storage the most as quantified by the evaluation score of the triggered optimization module.

4. The computer-implemented method of claim 1, comprising filtering out one or more operations from the list of candidate operations based on a penalty associated with performing the one or more operations on the partitions of the scalable storage.

5. The computer-implemented method of claim 1, comprising determining that the candidate operation would diminish the model of the state of the scalable storage based on a change in the evaluation score that would be caused by performing the candidate operation on the model of the state.

6. The computer-implemented method of claim 1, comprising determining that at least one operation in the list of candidate operations would improve the model of the state of the scalable storage based on a change in the evaluation score that would be caused by performing the at least one operation on the model of the state.

7. The computer-implemented method of claim 1, comprising for another selected optimization module of the plurality of optimization modules that has a lower priority than the triggered optimization module, removing a candidate operation from the at least one operation that would diminish the model of the state of the scalable storage as quantified by an evaluation score of the another selected optimization module.

8. The computer-implemented method of claim 1, wherein the evaluation score of each of the plurality of optimization modules is determined by a different evaluation function.

9. The computer-implemented method of claim 1, wherein the at least one operation comprises a single operation.

10. The computer-implemented method of claim 1, wherein the operation is any one of:
    a movement of one of the partitions to a different one of the servers of the scalable storage, a splitting of the one of the partitions to multiple partitions assigned to ones of the servers of the scalable storage, and a merging of ones of the partitions into a shared partition.

11. One or more computer-storage media storing computer-useable instructions that, when executed by a computing device, perform a method for load balancing a scalable storage, the method comprising:
    for each triggered optimization module, of a plurality of optimization modules, optimizing the scalable storage based on an optimization routine, the optimization routine comprising:
       generating a list of candidate operations, wherein each candidate operation in the list comprises a load balancing operation associated with at least one partition assigned to a server of the scalable storage;
       for a selected optimization module of the plurality of optimization modules that has a higher priority than the triggered optimization module, removing a candidate operation from the list of candidate operations that would diminish a model of the state of the scalable storage as quantified by an evaluation score of the selected optimization module;
       determining at least one operation in the list of candidate operations that would improve the model of the state of the scalable storage as quantified by an evaluation score of the triggered optimization module;
       adding the at least one operation to a set of proposed operations; and
       updating the model of the state of the scalable storage to model executing the at least one operation on the state of the scalable storage;
    executing the set of proposed operations on the state of the scalable storage.

12. The one or more computer-storage media of claim 11, comprising repeating the optimization routine for one of the plurality of optimization modules in response to a trigger condition of the one of the plurality of optimization modules still being met as determined by the updated model of the scalable storage.

13. The one or more computer-storage media of claim 11, wherein the optimization routine for each triggered optimization module is in response to a respective trigger condition of the triggered optimization module being met.

14. The one or more computer-storage media of claim 13, wherein the executing is in response to each of the respective trigger conditions no longer being met.

15. The one or more computer-storage media of claim 11, wherein the optimization routine for at least one of the plurality of optimization modules is in response to a trigger score exceeding a threshold value, the trigger score being calculated from the model of the state of the scalable storage.

16. The one or more computer-storage media of claim 11, wherein the optimization routine for at least one of the plurality of optimization modules is performed in response to a plurality of the partitions of an account of a plurality of accounts hosted by the scalable storage having an imbalance in assignments with respect to one or more of the servers.

17. The one or more computer-storage media of claim 11, wherein the optimization routine for at least one of the plurality of optimization modules is performed in response to the partitions of the scalable storage having an imbalance in resource utilization with respect to the servers.

18. A computer-implemented system comprising:
at least one processor;
one or more computer-readable media having executable instructions embodied thereon, which, when executed by the at least one processor, cause the at least one processor to perform a method comprising:
determining that a trigger condition of a triggered optimization module of a plurality of optimization modules is met;
optimizing the scalable storage based on an optimization routine, the optimization routine comprising:
generating a list of candidate operations for a state of the scalable storage, wherein each candidate operation in the list comprises a load balancing operation associated with at least one partition assigned to a server of the scalable storage;
for a selected optimization module of the plurality of optimization modules that has a higher priority than the triggered optimization module, removing a candidate operation from the list of candidate operations that would diminish a model of the state of the scalable storage as quantified by an evaluation score of the selected optimization module;
determining at least one operation in the list of candidate operations that would improve the model of the state of the scalable storage as quantified by an evaluation score of the triggered optimization module; and
updating the model of the state of the scalable storage to model executing the at least one operation on the state of the scalable storage; and
executing the at least one operation on the state of the scalable storage.

19. The computer-implemented system of claim 18, wherein the method comprises repeating the optimization routine in response to the trigger condition still being met as determined by the updated model of the scalable storage, wherein the executing comprises executing the at least one operation from each instance of the optimization routine on the state of the scalable storage.

20. The computer-implemented system of claim 18, wherein the determining the at least one operation comprises selecting one or more operations corresponding to a percentage of operations in the list of candidate operations that would improve the model of the state of the scalable storage the most as quantified by the evaluation score of the triggered optimization module.

* * * * *